United States Patent
Murasawa et al.

(10) Patent No.: US 6,760,594 B1
(45) Date of Patent: Jul. 6, 2004

(54) METHOD OF CONNECTING PRIORITY CALL IN WIRELESS COMMUNICATION SYSTEM AND APPARATUS FOR ACHIEVING METHOD

(75) Inventors: Shunichi Murasawa, Kawasaki (JP); Ryoichi Ishibashi, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 216 days.

(21) Appl. No.: 09/605,515

(22) Filed: Jun. 28, 2000

(30) Foreign Application Priority Data

Jul. 2, 1999 (JP) ............................................ 11-188959

(51) Int. Cl.⁷ ................................................ H04B 7/00
(52) U.S. Cl. ................. 455/512; 455/452.1; 455/452.2; 455/424; 370/335; 370/437
(58) Field of Search ............................ 455/453, 452.1, 455/450, 442, 527, 528, 424, 452.2, 512; 370/335, 437

(56) References Cited

U.S. PATENT DOCUMENTS

| | | | | |
|---|---|---|---|---|
| 5,574,977 A | * | 11/1996 | Joseph et al. ............... | 455/450 |
| 5,615,249 A | * | 3/1997 | Solondz ...................... | 455/450 |
| 5,722,043 A | * | 2/1998 | Rappaport et al. ........ | 455/452.1 |
| 5,752,193 A | * | 5/1998 | Scholefield et al. ........ | 455/452 |
| 5,802,445 A | | 9/1998 | Weideman et al. | |
| 6,067,457 A | * | 5/2000 | Erickson et al. ............ | 455/512 |
| 6,112,101 A | * | 8/2000 | Bhatia et al. ............... | 455/512 |
| 6,119,012 A | * | 9/2000 | Amirijoo ................. | 455/456.1 |
| 6,128,500 A | * | 10/2000 | Raghavan et al. .......... | 455/453 |
| 6,192,248 B1 | * | 2/2001 | Solondz ...................... | 455/450 |
| 6,295,453 B1 | * | 9/2001 | Desgagne et al. .......... | 455/448 |
| 6,374,099 B1 | * | 4/2002 | Bi et al. .................. | 455/404.1 |
| 6,484,145 B1 | * | 11/2002 | Horne et al. .................... | 705/8 |
| 2002/0052206 A1 | * | 5/2002 | Longoni ..................... | 455/453 |

FOREIGN PATENT DOCUMENTS

| | | |
|---|---|---|
| JP | 8-289367 | 11/1996 |
| JP | 9-69807 | 3/1997 |

\* cited by examiner

Primary Examiner—William Trost
Assistant Examiner—Sharad Rampuria
(74) Attorney, Agent, or Firm—Katten Muchin Zavis Rosenman

(57) ABSTRACT

A method of connection of a priority call in a wireless communication system able to assign channels making full utilization of system resources and to thereby prevent failure of connection (call loss) of an emergency call or other priority call, which sets a maximum threshold Th.III between a critical threshold Th.IV constituting an upper limit, in terms of hardware, on the number of calls able to be assigned channels in a wireless section, and a design threshold Th.II constituting an upper limit, in terms of software design. It assigns a priority call a channel and connects the call to the exchange side even if the total number of calls exceeds the design threshold Th.II, but if it determines that it is smaller than the maximum threshold Th.III, performs breathing when the total number of calls exceeds the design threshold Th.II, and sends a standby instruction message to the terminal side when it determines that the total number of calls has exceeded the maximum threshold Th.III.

16 Claims, 24 Drawing Sheets

Fig. 8

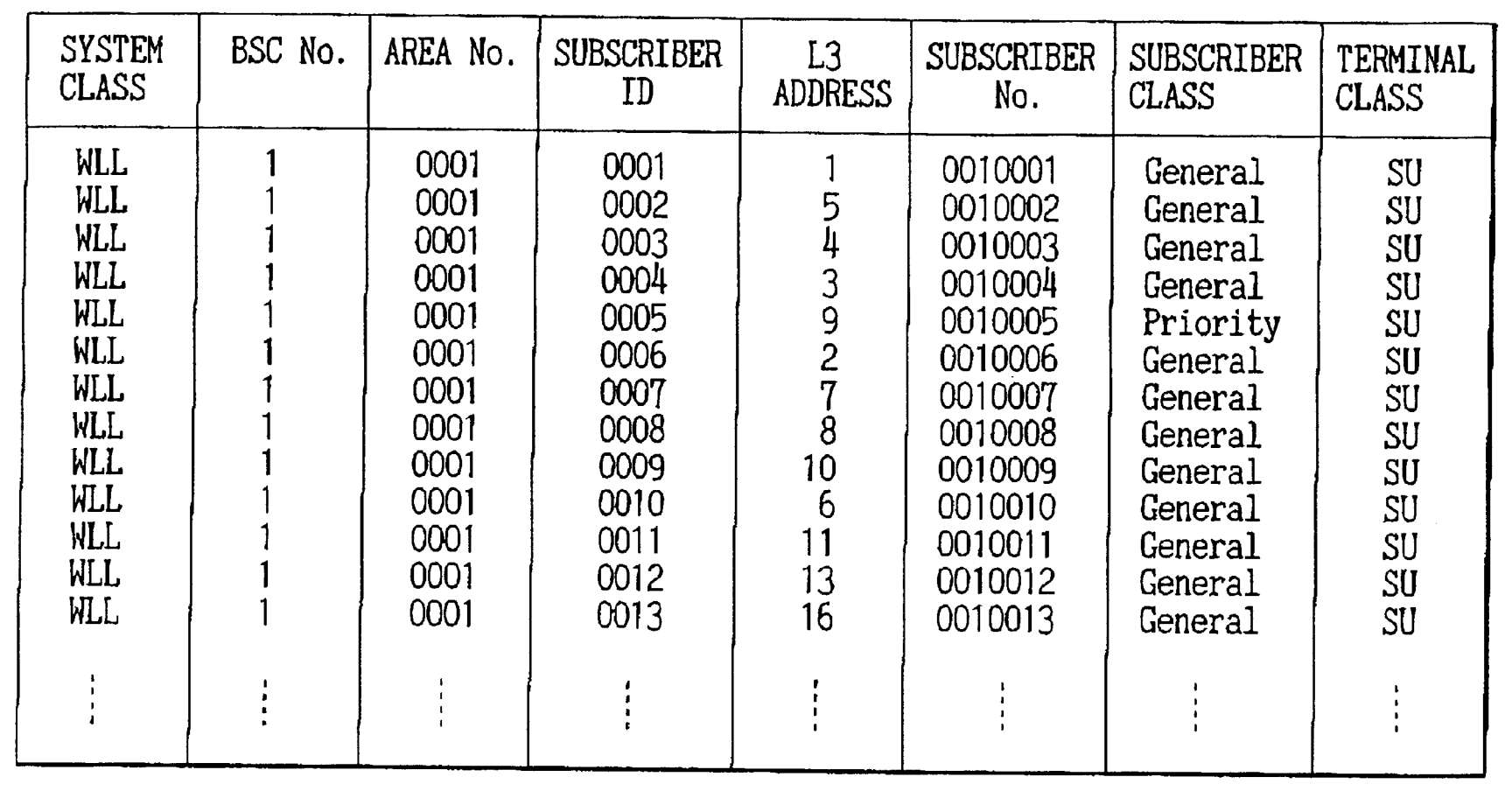

| SYSTEM CLASS | BSC No. | AREA No. | SUBSCRIBER ID | L3 ADDRESS | SUBSCRIBER No. | SUBSCRIBER CLASS | TERMINAL CLASS |
|---|---|---|---|---|---|---|---|
| WLL | 1 | 0001 | 0001 | 1 | 0010001 | General | SU |
| WLL | 1 | 0001 | 0002 | 5 | 0010002 | General | SU |
| WLL | 1 | 0001 | 0003 | 4 | 0010003 | General | SU |
| WLL | 1 | 0001 | 0004 | 3 | 0010004 | General | SU |
| WLL | 1 | 0001 | 0005 | 9 | 0010005 | Priority | SU |
| WLL | 1 | 0001 | 0006 | 2 | 0010006 | General | SU |
| WLL | 1 | 0001 | 0007 | 7 | 0010007 | General | SU |
| WLL | 1 | 0001 | 0008 | 8 | 0010008 | General | SU |
| WLL | 1 | 0001 | 0009 | 10 | 0010009 | General | SU |
| WLL | 1 | 0001 | 0010 | 6 | 0010010 | General | SU |
| WLL | 1 | 0001 | 0011 | 11 | 0010011 | General | SU |
| WLL | 1 | 0001 | 0012 | 13 | 0010012 | General | SU |
| WLL | 1 | 0001 | 0013 | 16 | 0010013 | General | SU |
| ---- | ---- | ---- | ---- | ---- | ---- | ---- | ---- |

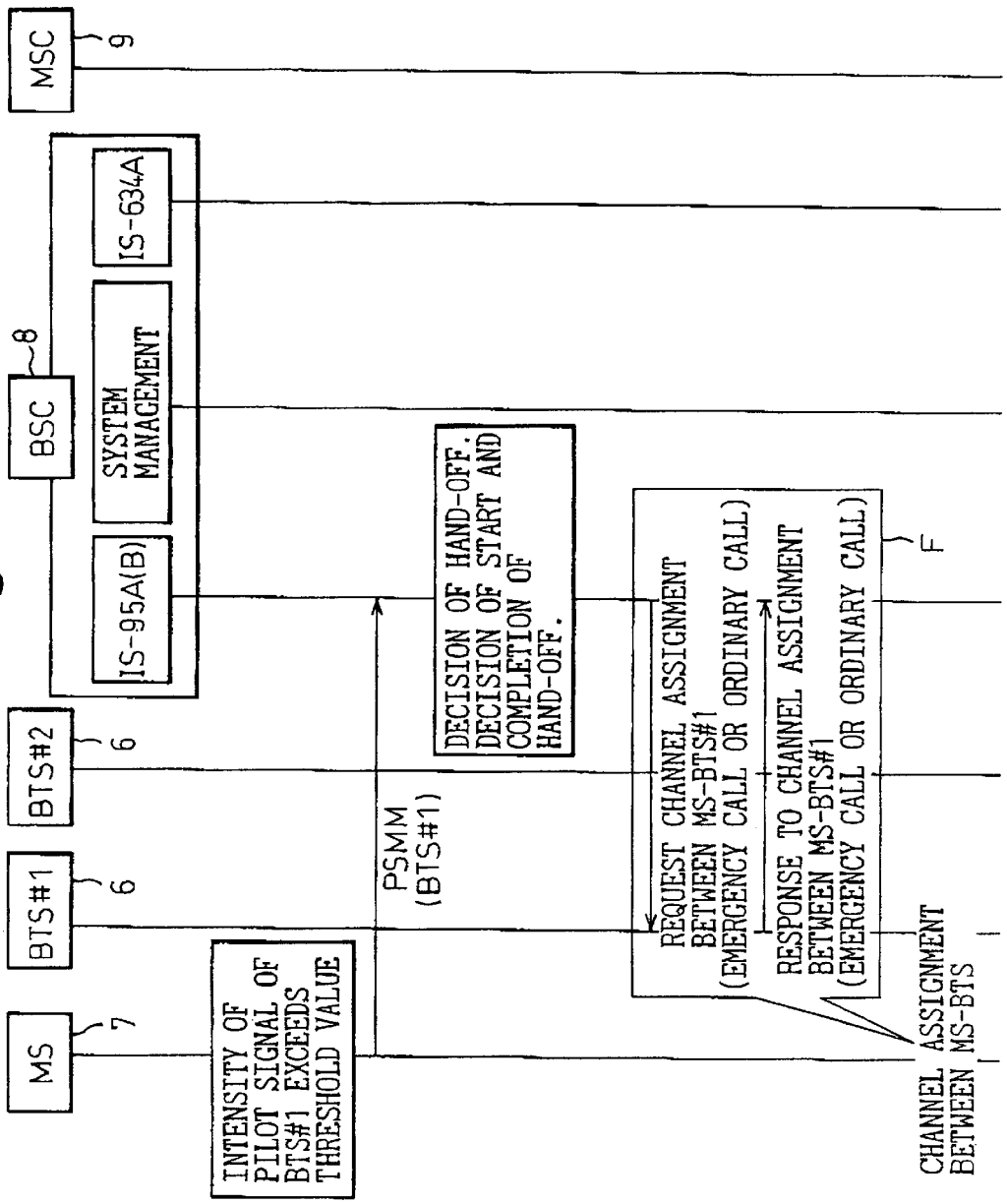

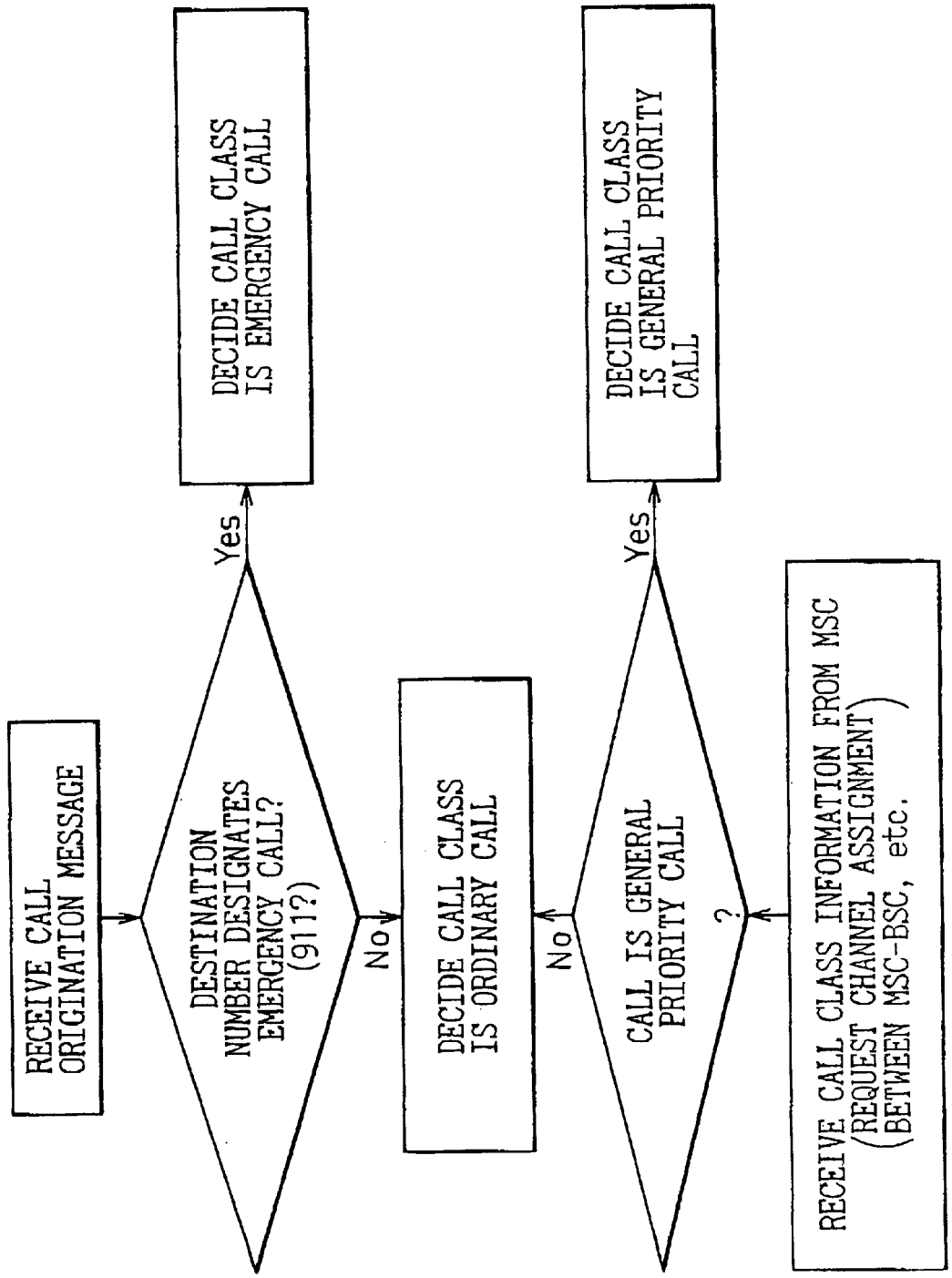

BEFORE BREATHING BY BTS1 (STATE 1)

RIGHT AFTER BREATHING BY BTS1 (STATE 2)

COMMUNICATION BY MS1 WITH BTS2 ONLY (STATE 3)

METHOD OF CONNECTING PRIORITY CALL IN WIRELESS COMMUNICATION SYSTEM AND APPARATUS FOR ACHIEVING METHOD

BACKGROUND OF THE INVENTION

1. Field of the Invention

The present invention relates to a method of connecting a priority call in a wireless communication system and an apparatus for the same, more preferably relates to a method of connecting a priority call in a wireless local loop (WLL) system or a cellular system using code division multiple access (CDMA) and an apparatus for the same.

CDMA has the advantages of a higher efficiency of utilization of frequency compared with the conventional time division multiple access (TDMA) and frequency division multiple access (FDMA). It is a multiple access system essential for the next generation of wireless communication systems where a shortage of frequencies will be a concern. The utilization of CDMA, as described above, has the effects of, of course, enabling effective utilization of the frequency and, also, improving privacy and, further, facilitating hand-off between cells.

2. Description of the Related Art

As will be explained in detail later by using the drawings, in the general sequence of channel assignment, when the total number of calls in a wireless section reaches the total number of channels which can be assigned in that same section and a priority call is generated, an ordinary call currently in progress is compulsorily disconnected and the related channel is handed over to that priority call.

In the above sequence, first, the base station controller side determines if a call is an ordinary call or priority call, then requests channel assignment (resource assignment) to a base station transceiver subsystem. The base station transceiver subsystem notifies the base station controller that it cannot assign a channel since all of its wireless channels are in use. When connecting a priority call on a preferential basis, the base station controller then disconnects a certain call among the ordinary calls in progress. Therefore, the base station controller and the exchange disconnect a call in progress between them and then disconnect the call between the base station transceiver subsystem and base station controller and next between the base station transceiver subsystem and terminal. By doing this, an opening arises in the channels (resources) in the wireless section which had previously been all in use, so the base station controller sends the base station transceiver subsystem a channel (resource) assignment request again and the base station transceiver subsystem sends the base station controller a channel (resource) assignment response.

Summarizing the problems to be solved by the invention, as mentioned above, there was the first problem that, in the past, another terminal had to be forcibly disconnected in order to enable a priority call to be preferentially connected, so the quality of service was poor.

Further, there was the second problem that no consideration was given to making full and effective utilization of the resources possessed by the system for improvement of the quality of service.

SUMMARY OF THE INVENTION

An object of the present invention is to provide a method of connecting a priority call in a wireless communication system which provides a scheme of channel assignment enabling full and effective utilization of resources of the system and which enables prevention of failure of connection (call loss) of a priority call without compulsorily disconnecting any ordinary calls in progress and an apparatus for achieving that method.

To attain the above object, the method of the present invention sets a maximum threshold Th.III between a critical threshold Th.IV constituting an upper limit, in terms of hardware, on the number of calls able to be assigned channels in a wireless section, and a design threshold Th.II constituting an upper limit in terms of software design. It assigns a priority call a channel and connects the call to the exchange side even if the total number of calls exceeds the design threshold Th.II, but if it determines that the number is smaller than the maximum threshold. Th.III. Further it performs breathing when the total number of calls exceeds the design threshold Th.II, and sends a standby instruction message to the terminal when it determines that the total number of calls has exceeded the maximum threshold Th.III.

Therefore, the wireless communication system assigns channels making full utilization of the resources and prevents failure of connection (call loss) of an emergency call or other priority call.

BRIEF DESCRIPTION OF THE DRAWINGS

The above object and features of the present invention will be more apparent from the following description of the preferred embodiments given with reference to the accompanying drawings, wherein:

FIG. 8 is a view of the format of display of general subscriber information;

FIG. 11 is a view of the general sequence of channel assignment at a soft hand-off in a cellular system;

FIG. 12 is a view of the flow of determination of a class of a call in a cellular system;

DESCRIPTION OF THE PREFERRED EMBODIMENTS

Before describing the embodiments of the present invention, the related art and the disadvantages therein will be described with reference to the related figures.

Related Art

Figure 20:
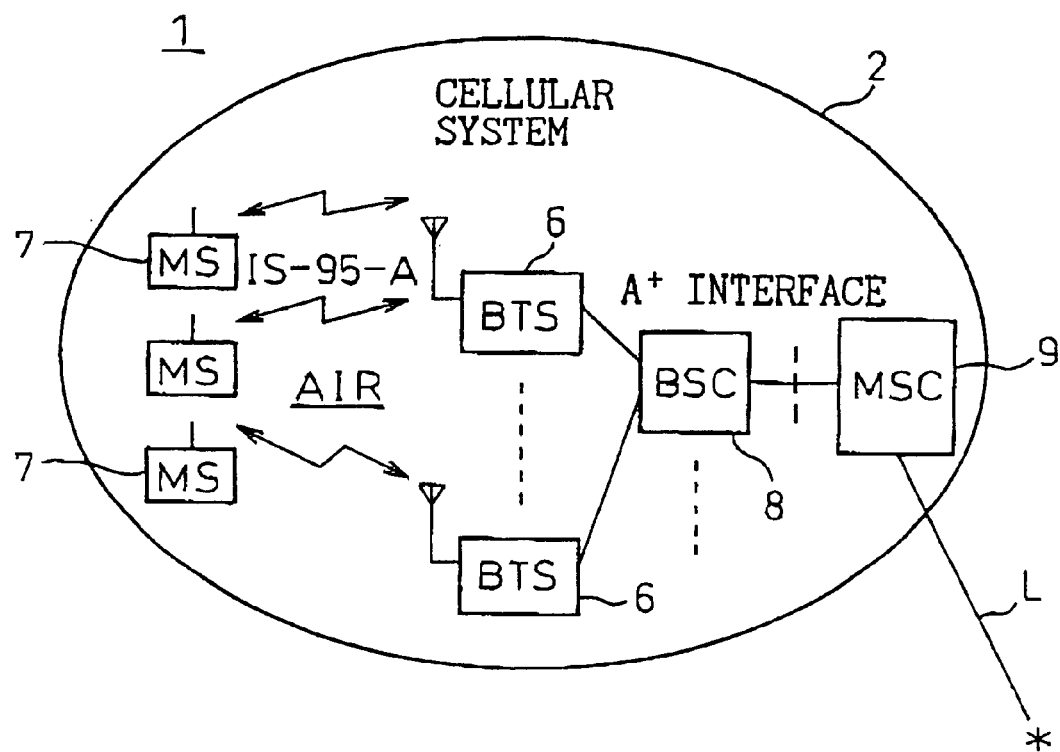
FIG. 20 is first part of the overall configuration of a general wireless communication system using CDMA.
Figure 21:
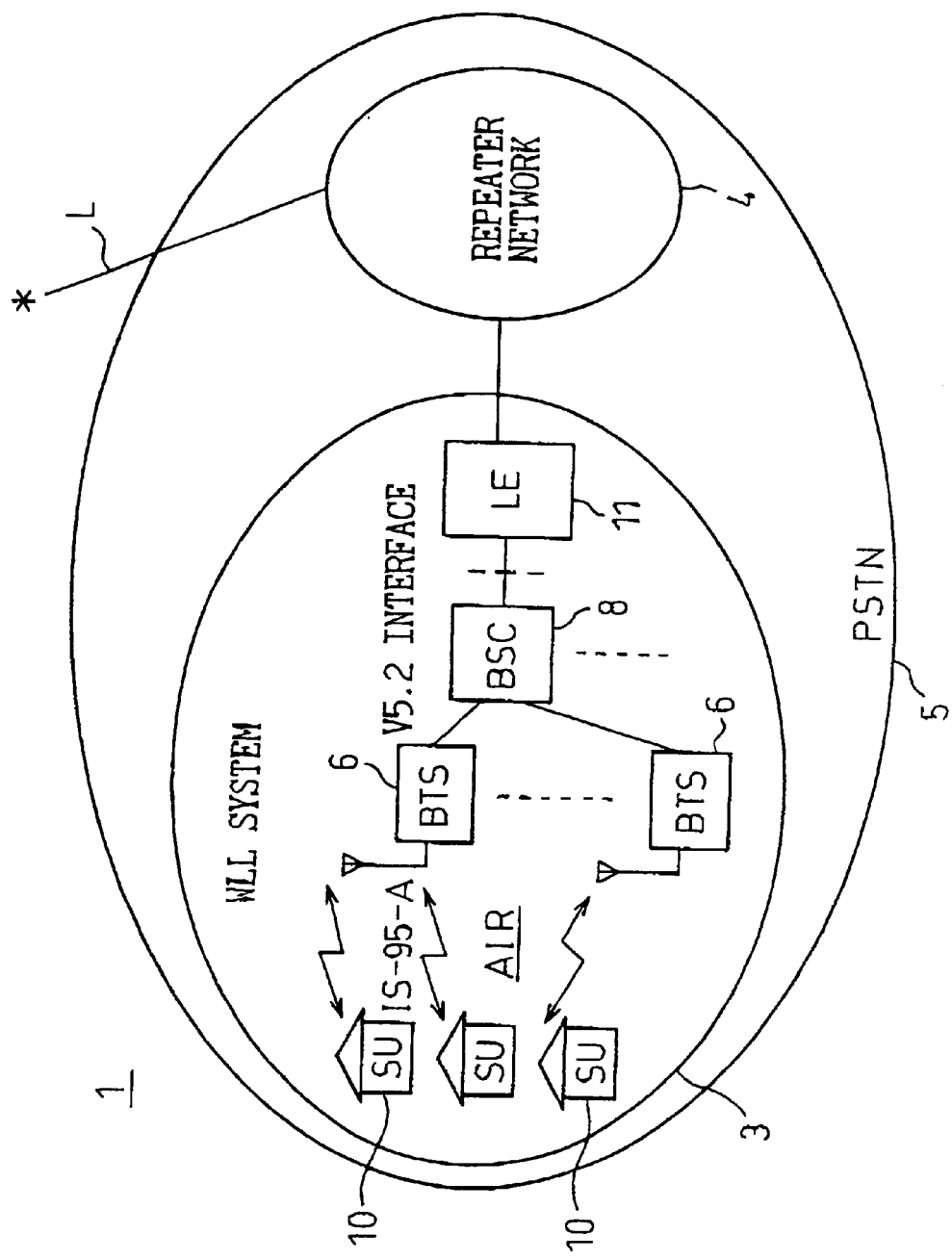
FIG. 21 is a second part of the overall configuration of a general wireless communication system using CDMA.

FIGS. 20 and 21 are parts of a view of the overall configuration of a general wireless communication system using CDMA.

In FIGS. 20 and 21, a wireless communication system 1 comprises at least one of a cellular system 2 and a wireless local loop (WLL) system 3. The wireless local loop system 3 is formed as part of a public switching telephone network (PSTN) 5 together with a repeater network 4. This public switching telephone network 5 can be linked with the cellular system 2 via the repeater network 4 and a transmission line L.

Both of the cellular system 2 (or a personal communication network (PCN)) and the wireless local loop system 3 are provided with a base station transceiver subsystem (BTS) 6 and a base station controller (BSC) 8. Note that the present invention is mainly related to the former base station transceiver subsystem 6.

In the cellular system 2, the base station transceiver subsystem 6 sends and receives signals with a plurality of terminals (mobile stations (MS)) 7 via a wireless section AIR by using for example an IS-95-A protocol. Further, the base station controller 8 is connected via for example an A+ interface to a mobile switching center (MSC) 9.

On the other hand, in the wireless local loop system 3 formed in the public switching telephone network 5, the base station transceiver subsystem 6 sends and receives signals with a plurality of terminals (subscriber units (SU)) 10 via the wireless section AIR by using for example the IS-95-A protocol. Further, the base station controller 8 is connected to a line exchanger (LE) 11 via for example a V5.2 interface and further connected to the repeater network 4.

As shown in FIGS. 20 and 21, as a communication system 1 utilizing a wireless system, there are a cellular system 2, wireless local loop system 3, etc. A cellular system 2 is configured as an independent network from the already existing public switching telephone network 5 and has terminals (mobile stations) 7 which are mobile. On the other hand, a wireless local loop system 3 makes a subscriber system of the public switching telephone network 5 wireless and has terminals (subscriber units) 10 which are fixed. The terminals 7 and 10, that is, the mobile terminals in the cellular system 2 and fixed terminals in the wireless local loop system 3, all have interface functions and wireless transmission and reception functions with the base station transceiver subsystem 6. Further, the base station transceiver subsystem 6 has an interface function and wireless transmission and reception function with the base station controller 8 side and the terminal (mobile station, subscriber unit) side, a wired/wireless switching function, and so on. On the other hand, the base station controller 8 has an interface function etc. with the base station transceiver subsystem 6 and exchange side (mobile switching center 9 side shown in the case of a cellular system 2 and line exchanger 11 side in the case of the wireless local loop system 3) and controls the base station transceiver subsystem 6.

The wireless communication system 1 explained above must preferentially connect a priority call originating from a terminal (mobile station) 7 or a terminal (subscriber unit) 10, even during channel congestion, to the exchange (mobile switching center 9 or line exchanger 11) side.

Every time a call is generated from the terminal (mobile station, subscriber unit) side, the wireless communication system 1 determines whether or not the total number of calls at that time is smaller than a predetermined threshold when it is smaller than the threshold, it assigns a channel (assigns resources) in the wireless section AIR and connects the related call to the exchange (mobile switching center, line exchanger) side. Here, there is a problem of how to assign a channel (assign resources) when a priority call is generated. Note that a "priority call" in the present invention is the generic term for a general priority call (signal originated from a preferential subscriber who has contracted for a preferential connection service with the system manager) and an emergency call (911 call). The two are not particularly differentiated in the following explanation. Further, an "ordinary call" is the generic term for calls other than general priority calls and emergency calls.

Figure 22:
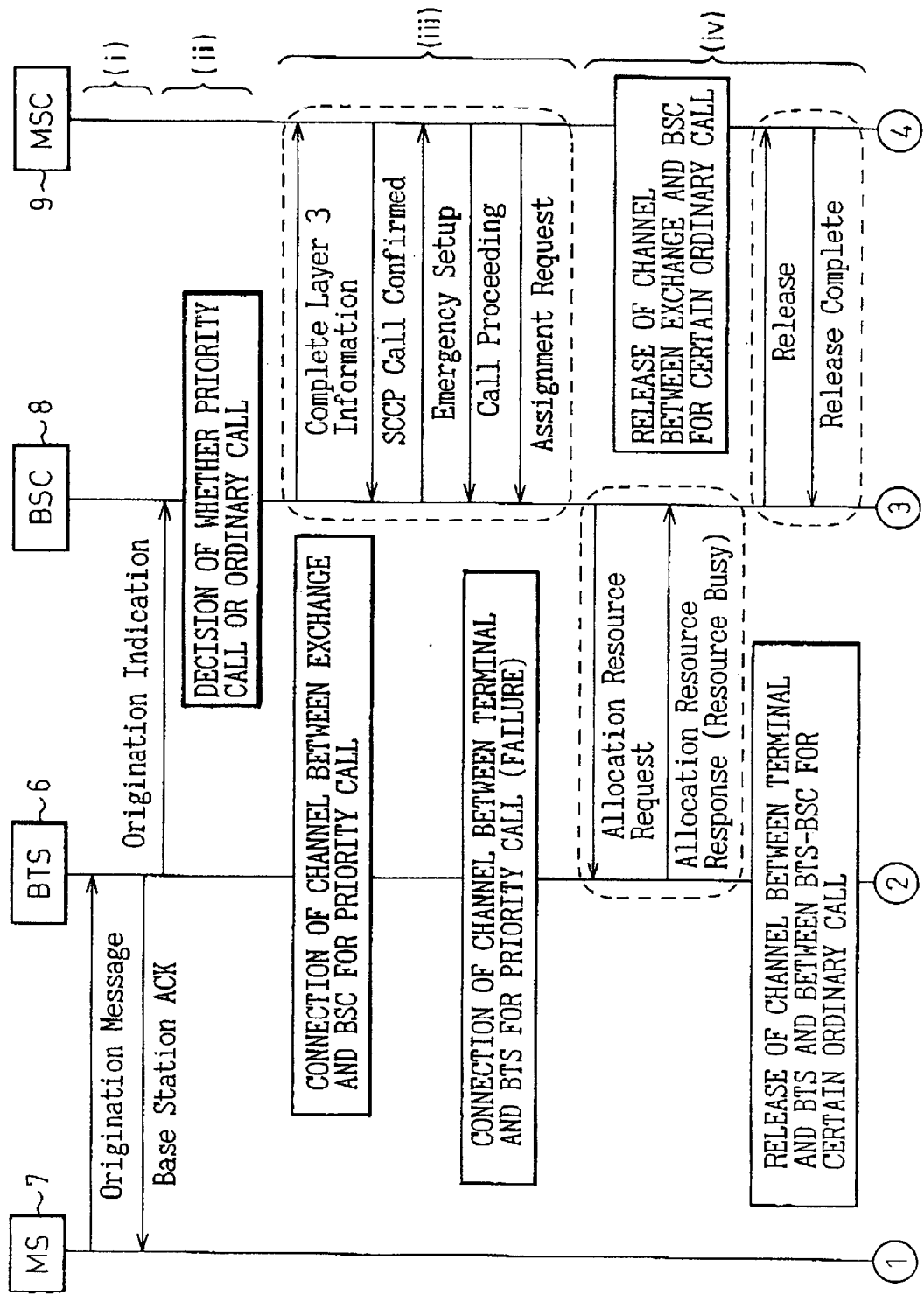
FIG. 22 is a first part of a view of the sequence of general channel assignment where a priority call occurs.
Figure 23:
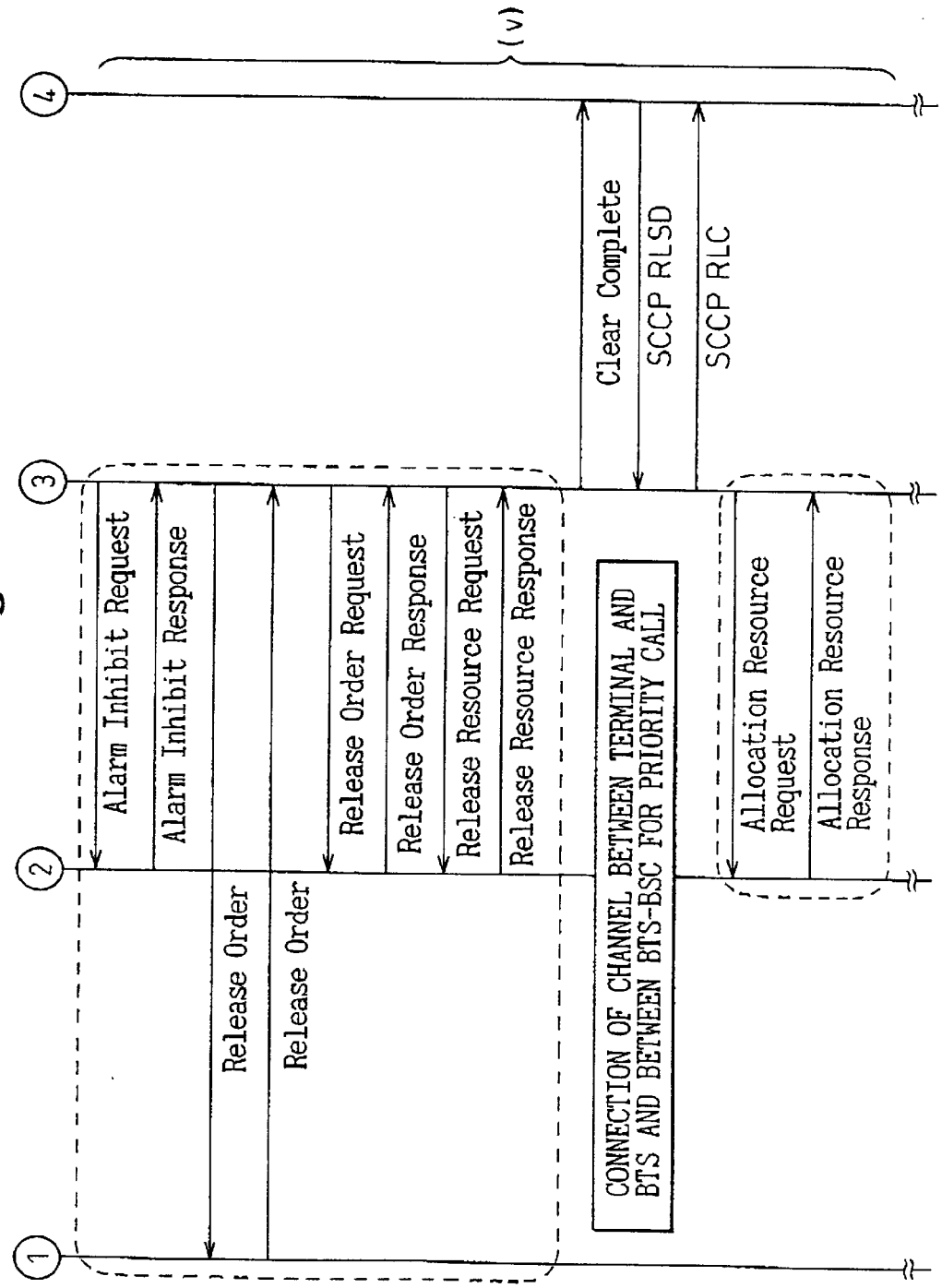
FIG. 23 is a second part of a view of the sequence of general channel assignment where a priority call occurs.

FIGS. 22 and 23 are parts of a view of the sequence for general channel assignment when a priority call is generated. Note that although the case of the cellular system 2 is shown, the same is basically true for the wireless local loop system 3 as well.

According to the general sequence shown in FIGS. 22 and 23, if a priority call is generated when the total number of calls in the wireless section AIR reaches the total number of channels which can be assigned in the same section, a certain ordinary call in progress (for example, the call connected the longest) is compulsorily disconnected, and the related channel is handed over to the priority call. This operation will be explained in brief below.

(i) The terminal 7 originates a call. At this time, assume that the call is a priority call.

(ii) The base station controller 8 determines whether that call is a priority call or ordinary call.

(iii) It determines that it is a priority call, but the wireless section is congested and therefore it cannot assign a channel to the related priority call, so fails to connect it to the exchange.

(iv) Therefore, the base station controller 8 links with the base station transceiver subsystem 6 and the mobile switching center 9 and compulsorily disconnects a certain call among the ordinary calls in progress.

(v) It executes a connection procedure for enabling the channel which had been used by the disconnected call to be preferentially used by the above priority call. Note that, in the figure, SCCP means "signaling connection control part"

and is layer 3 protocol between the mobile switching center and base station controller. SCCP RLSD (released) is a link release instruction message at the layer 3 level, while SCCP RLC (release complete) is the link release confirmation message at the layer 3 level.

Namely, in the above sequence, first, the base station controller side determines if a call is an ordinary call or priority call, then requests channel assignment (resource assignment) to a base station transceiver subsystem 6. The base station transceiver subsystem 6 notifies the base station controller 8 that it cannot assign a channel since all of its wireless channels are in use (sends back a "resource busy" response). When connecting a priority call on a preferential basis, the base station controller 8 then disconnects a certain call among the ordinary calls in progress. Therefore, the base station controller 8 and the exchange 9 disconnect the certain call in progress between them and then disconnect the call between the base station transceiver subsystem 6 and base station controller 8 and next between the base station transceiver subsystem 6 and terminal 7. By doing this, an opening arises in the channels (resources) in the wireless section which had previously been all in use, so the base station controller 8 sends the base station transceiver subsystem 6 a channel (resource) assignment request again and the base station transceiver subsystem 6 sends the base station controller 8 a channel (resource) assignment response.

Summarizing the problems to be solved by the invention, as mentioned above, there was the first problem that, in the past, another terminal had to be forcibly disconnected in order to enable a priority call to be preferentially connected, so the quality of service was poor.

Further, there was the second problem that no consideration was given to making full and effective utilization of the resources possessed by the system for improvement of the quality of service.

Therefore, in consideration of the above problems, the present invention provides a method of connecting a priority call in a wireless communication system which provides a scheme of channel assignment enabling full and effective utilization of resources of the system and which enables prevention of failure of connection (call loss) of a priority call without compulsorily disconnecting any ordinary calls in progress and an apparatus for achieving that method. The present invention will be described in detail next.

Figure 1:
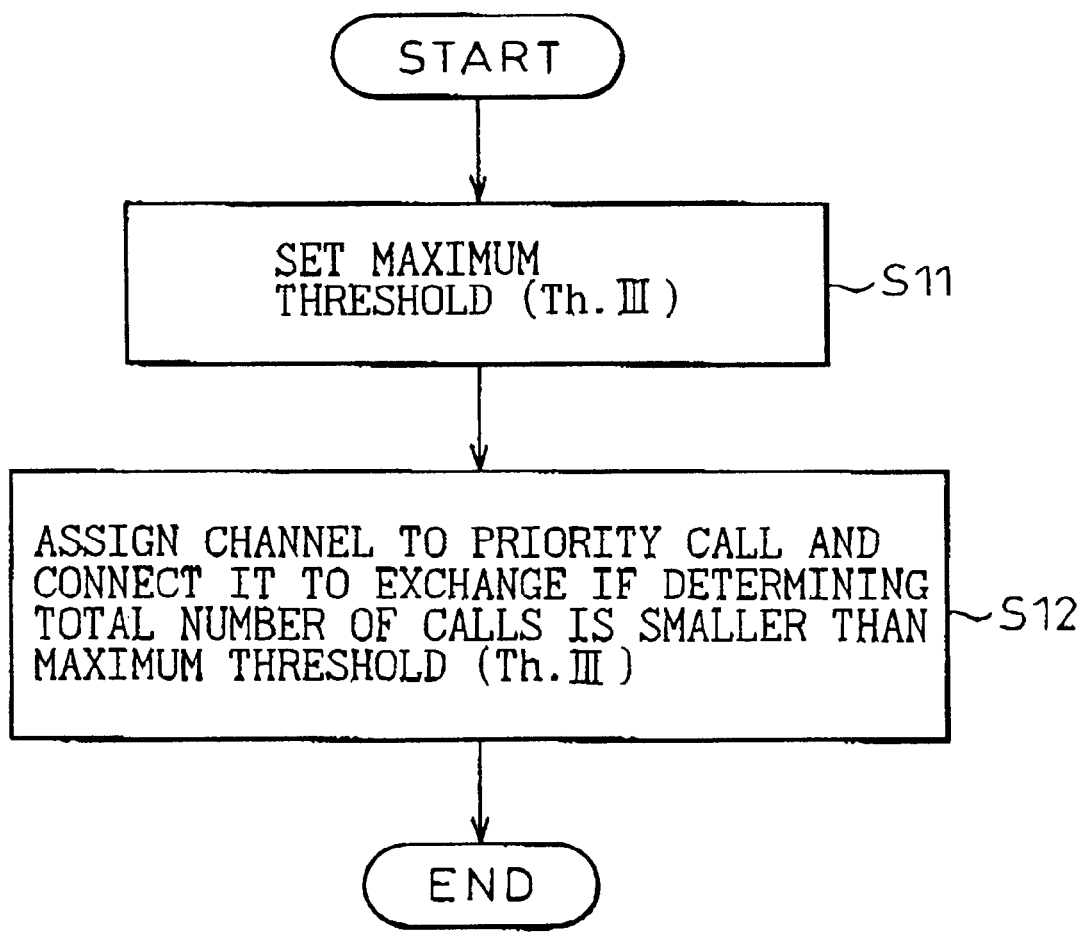
FIG. 1 is a view of basic steps in the method of connecting a priority call according to the present invention.

FIG. 1 is a view of basic steps in the method of connecting a priority call according to the present invention.

In the figure,

Step S11: A maximum threshold (Th.III) is set in advance placed between a critical threshold (Th. IV) constituting an upper limit, in terms of hardware, on the number of calls capable being assigned channels in the wireless section AIR and a design threshold (Th.II) constituting an upper limit, in circuit design, on the number of calls capable of being assigned channels in the wireless section AIR.

Step S12: Even if the total number of calls exceeds the design threshold (Th.II), if it is determined that the generated call is a priority call and it is determined that the total number is smaller than the maximum threshold (Th.III), the priority call is assigned a channel and connected to the exchange (mobile switching center, line exchanger) side.

Note that, step S11 does not have to be executed every time a priority call is generated. It may be executed once at the system startup. That is, if the maximum threshold (Th.III) is set in advance, the maximum threshold (Th.III) can be used fixedly thereafter.

Step S11 is an extremely useful step for full and effective utilization of resources, i.e., an object of the present invention, and is established based on the following idea.

There is a margin of safety between the critical threshold (Th.IV) and the design threshold (Th.II). The present invention first paid attention to this safety margin.

As explained above, the design threshold (Th.II) is the upper limit, in terms of circuit design, on the number of calls able to be assigned channels in the wireless section AIR. The cellular system 2 shown in FIG. 20 and the wireless local loop system 3 shown in FIG. 21 do not exist as single entities as illustrated. Usually a large number of similar systems exist while adjoining each other.

This being the case, the design threshold (Th.II) constituting the upper limit in terms of circuit design differs (is variable) for each of these systems (2, 3). On the other hand, looking at the critical threshold (Th.IV) constituting the upper limit in terms of hardware, it is extremely uneconomical cost-wise to change the system hardware for every system (2, 3), so usually the critical threshold (Th.IV) is fixed for all systems.

For this reason, usually the critical threshold (Th.IV) is set to a slightly higher level than the envisioned maximum design threshold (Th.II) so as to ensure that all design thresholds (Th.II) of the different system (2, 3) can be covered.

As a result, in many cases, there is a latent safety margin between the design threshold (Th.II) and the critical threshold (Th.IV). The present invention enables preferential connection of a priority call without compulsory disconnection of another call by effectively utilizing such a latent safety margin.

Figure 2:
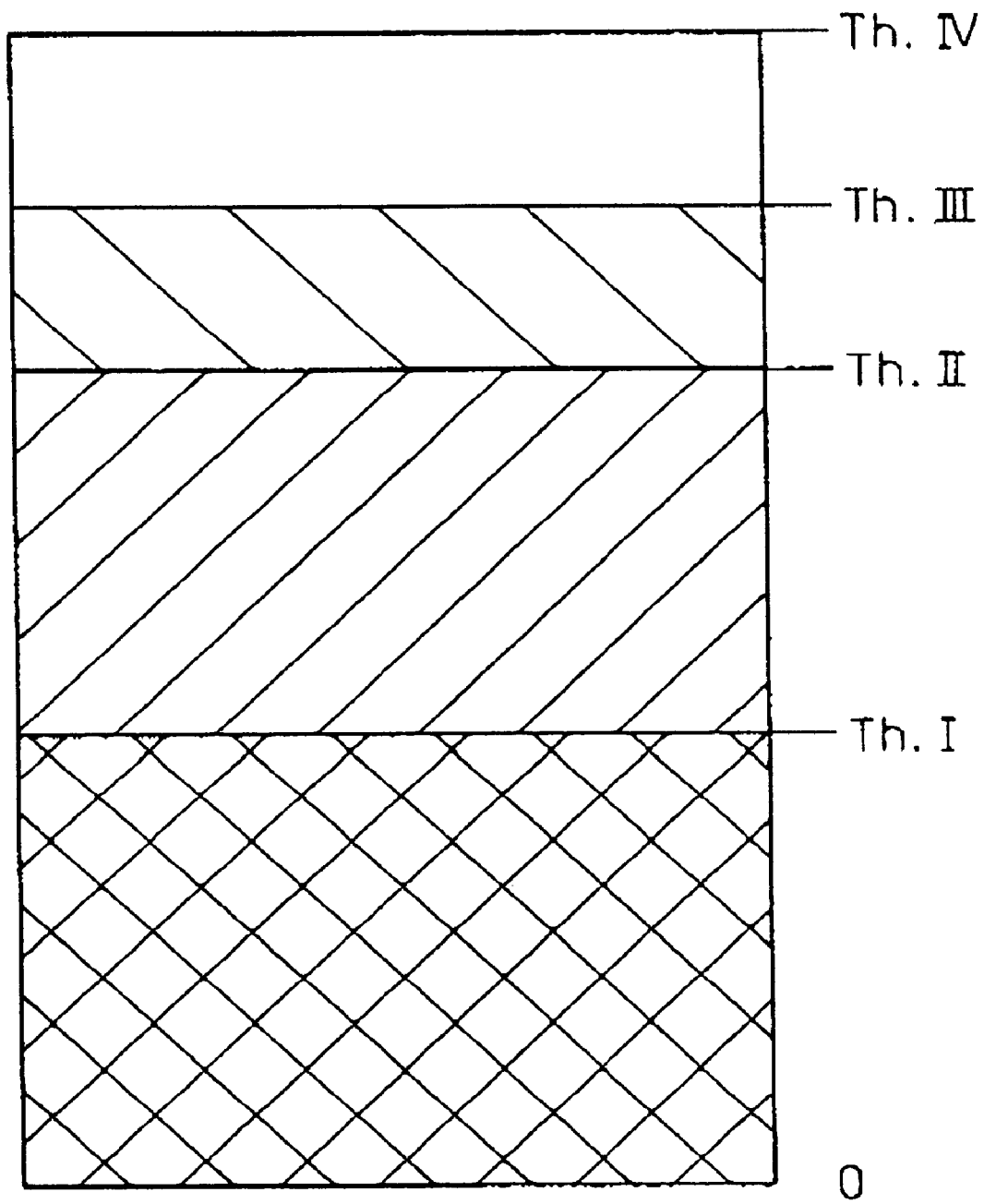
FIG. 2 is a view of relative levels of various thresholds used in the present invention.

FIG. 2 is a view of the relative levels of various thresholds used in the present invention.

As explained above, calls may be roughly classified into priority calls and ordinary calls other than the priority calls. Ordinary calls include ordinary calls derived from basic calls and ordinary calls derived from soft hand-off calls. Similarly, priority calls include priority calls derived from basic calls and priority calls derived from soft hand-off calls.

Here, a "basic call" means a call set at the start of communication, while a "soft hand-off call" means a call newly entered in the system (2) by a soft hand-off.

Accordingly, the total number of calls is determined by the sum of the basic calls consisting of calls set at the start of the communication and soft hand-off calls consisting of calls newly entered by soft hand-off. Note that in the case of a communication system 1 having only the wireless local loop system 3, a soft hand-off call cannot occur.

Here, referring to FIG. 2, Th.I is the design basic call threshold constituting the upper limit in the circuit design on basic calls.

Further, what is set at a level exceeding this design basic call threshold Th.I is the design threshold II. Note that when the soft hand-off rate is 100%, 50% of all channels up to Th.II are allocated to soft hand-off calls, and another 50% allocated to basic calls. Thus, the total channel capacity up to the threshold Th.II is the maximum channel capacity for which a predetermined quality of service can be maintained.

Further, the total channel capacity up to the critical threshold Th.IV is the maximum channel capacity which can be accommodated in terms of hardware.

The maximum threshold Th.III characterizing the present invention is set between the thresholds II and IV (Th.II<Th.III<Th.IV). Note that where, within the range of Th.II<Th.III<Th.IV, this maximum threshold Th.III should be selected is left to the discretion of the system manager. As one concrete example, it can be set at the middle of Th.II and Th.IV.

Figure 3:
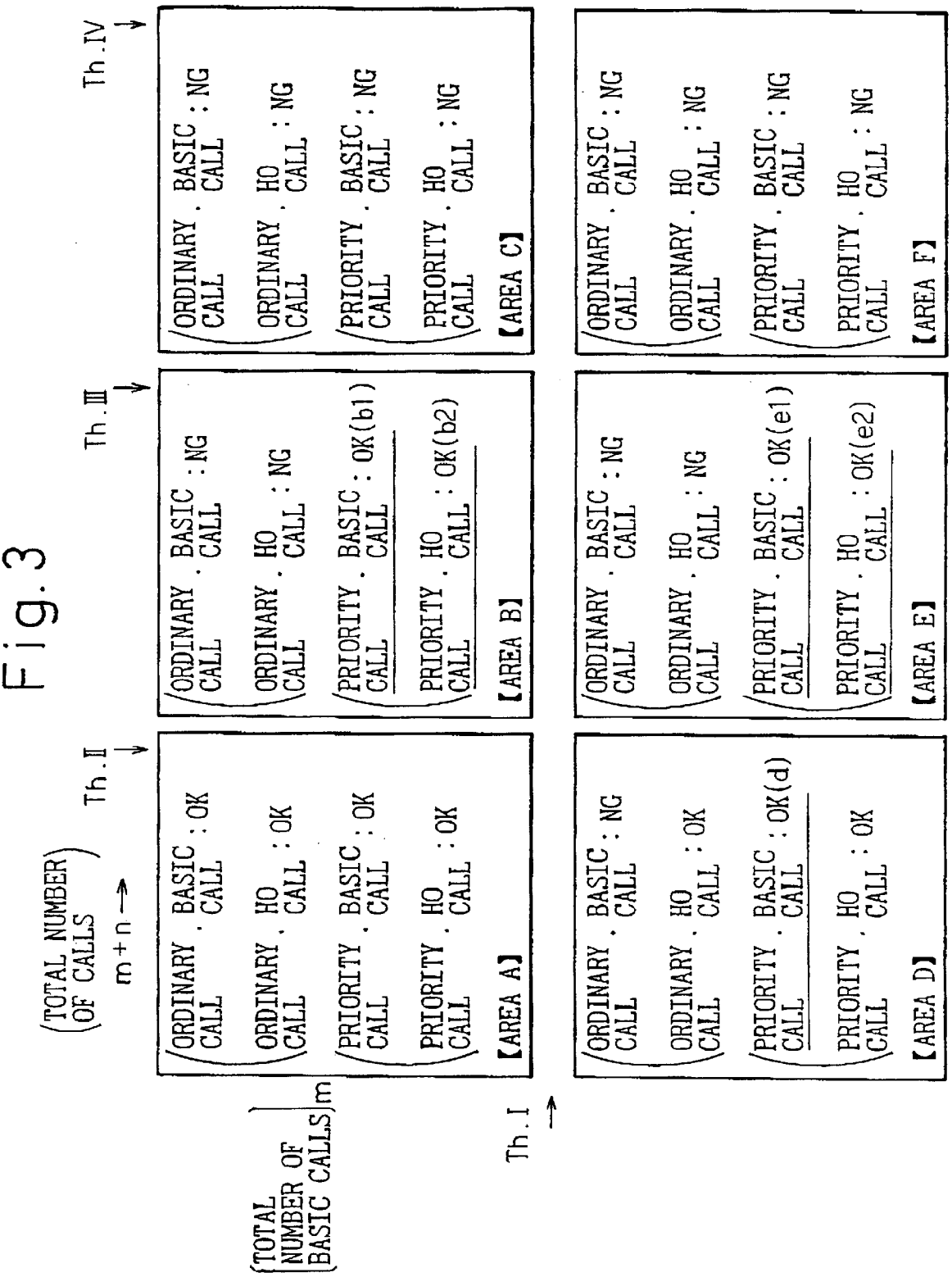
FIG. 3 is an area map of the standards for determining if a channel can be assigned based on the present invention.

FIG. 3 is an area map of the standards for determining if a channel can be assigned based on the present invention.

In the figure, the total number m of the basic calls is plotted in the vertical direction, while the sum of the total number m of the basic calls and the total number n of the soft hand-off calls, that is, the total number of calls (m+n), is plotted on the abscissa. The design basic call threshold Th.I is set in the vertical direction (the lower in the figure, the larger the m). On the other hand, the design threshold Th.II, the maximum threshold Th.III, and the critical threshold Th.IV are set in the horizontal direction in that order (m+n becomes larger toward the right side in the figure).

This being the case, the area map of the figure becomes divided into the illustrated six areas, that is area A to area F.

In these areas (A to F),
"ordinary call—basic call" indicates an ordinary call generated as a basic call,
"ordinary call—HO call" indicates an ordinary call generated as a soft hand-off call,
"priority call—basic call" indicates a priority call generated as a basic call, and
"priority call—HO call" indicates a priority call generated as a soft hand-off call.

Further, in the areas (A to F), "OK" indicates that channel assignment in the wireless section AIR is possible, while "NG" indicates that channel assignment is impossible.

For example, a "priority call—basic call" in the area A can be assigned a channel, (OK), since m is smaller than the threshold Th.I and m+n is smaller than the threshold Th.II. On the other hand, in the area D, an "ordinary call—basic call" cannot be assigned a channel, (NG), since while m+n is smaller than the threshold Th.II, m has reached the threshold Th.I or higher.

In the area map shown in FIG. 3, the calls to particularly note are shown underlined. Calls corresponding to them are priority calls (including general priority calls and emergency calls) which originally would fail to be connected (call loss), but which the present invention saves and avoids failure of connection (call loss). The priority calls saved in this way are classified into the following states.

(i) Priority call is generated as a basic call
wherein even though it is determined that the total number m of the basic calls able to be assigned channels in the wireless section AIR has reached the design basic call threshold Th.I constituting the upper limit in terms of circuit design or more, it is determined that the total number of calls (m+n) is smaller than the design threshold Th.II, whereby the related priority call is assigned a channel and connected to the exchange side (refer to d of FIG. 3).

(ii) Priority call is generated as a basic call
wherein it is determined that the total number m of basic calls able to be assigned channels in the wireless section AIR is smaller than the design basic call threshold Th.I constituting the upper limit in terms of circuit design and the total number of calls (m+n) has reached the design threshold Th.II or more, whereby it is determined if the total number of calls (m+n) is smaller than the maximum threshold Th.III and, if it is smaller, the call is assigned a channel (refer to b1 of FIG. 3).

(iii) Priority call is generated as a basic call
wherein it is determined that the total number m of basic calls able to be assigned channels in the wireless section AIR has reached the design basic call threshold Th.I constituting the upper limit in terms of circuit design or more and the total number of calls (m+n) has reached the design threshold Th.II or more, whereby it is determined if the total number of calls (m+n) is smaller than the maximum threshold Th.III and, if it is smaller, the call is assigned a channel (refer to e1 of FIG. 3).

(iv) Priority call is generated as a soft hand-off call (HO call)
wherein it is determined that the total number of calls (m+n) has reached the design threshold Th.II or more, whereby it is determined if the total number of calls (m+n) is smaller than the maximum threshold Th.III and, if it is smaller, the call is assigned a channel (refer to b2 and e2 of FIG. 3).

As described above, according to the present invention, even if the total number of calls exceeds the threshold Th.II, if it is smaller than the threshold Th.III, a priority call generated at that time can be saved. However, the channel assignment for the call after the threshold Th.II is exceeded is not the inherent channel assignment which is originally planned as the system, but this channel assignment is a special measure for saving a priority call according to the present invention.

Therefore, in the present invention, as a second embodiment, when assigning a channel to the priority call and connecting to the exchange (mobile switching center, line exchanger) side, 1 is added to the total number of calls (m+n). At the same time, when it is determined that the total number of calls has reached the design threshold Th.II or more, breathing is executed.

By performing breathing in this way, it becomes possible to quickly return to the so-called "normal state" where the total number of calls covered by the related base station transceiver subsystem 6 becomes smaller than the design threshold Th.II. Note that the breathing per se will be explained in detail later.

Due to the breathing, situations where priority calls are generated while the maximum threshold Th.III is exceeded probably would become very rare, but considering the occurrence of major fires etc., the probability could not be totally eliminated. Therefore, in the present invention, as a third embodiment, the following special measure is devised.

Namely, when it is determined that the total number of calls (m+n) reaches the maximum threshold Th.III or more, a standby instruction message is sent to the terminal (mobile station MS, subscriber unit SU) generating the related priority call. After this, when it is determined that the total number of calls has become smaller than the maximum threshold Th.III, the priority call is preferentially assigned a channel and connected to the exchange side. Due to this, the terminal (mobile station MS, subscriber unit SU) receiving the standby instruction message need only stand by for a shorter time for connection of the priority call.

Figure 4:
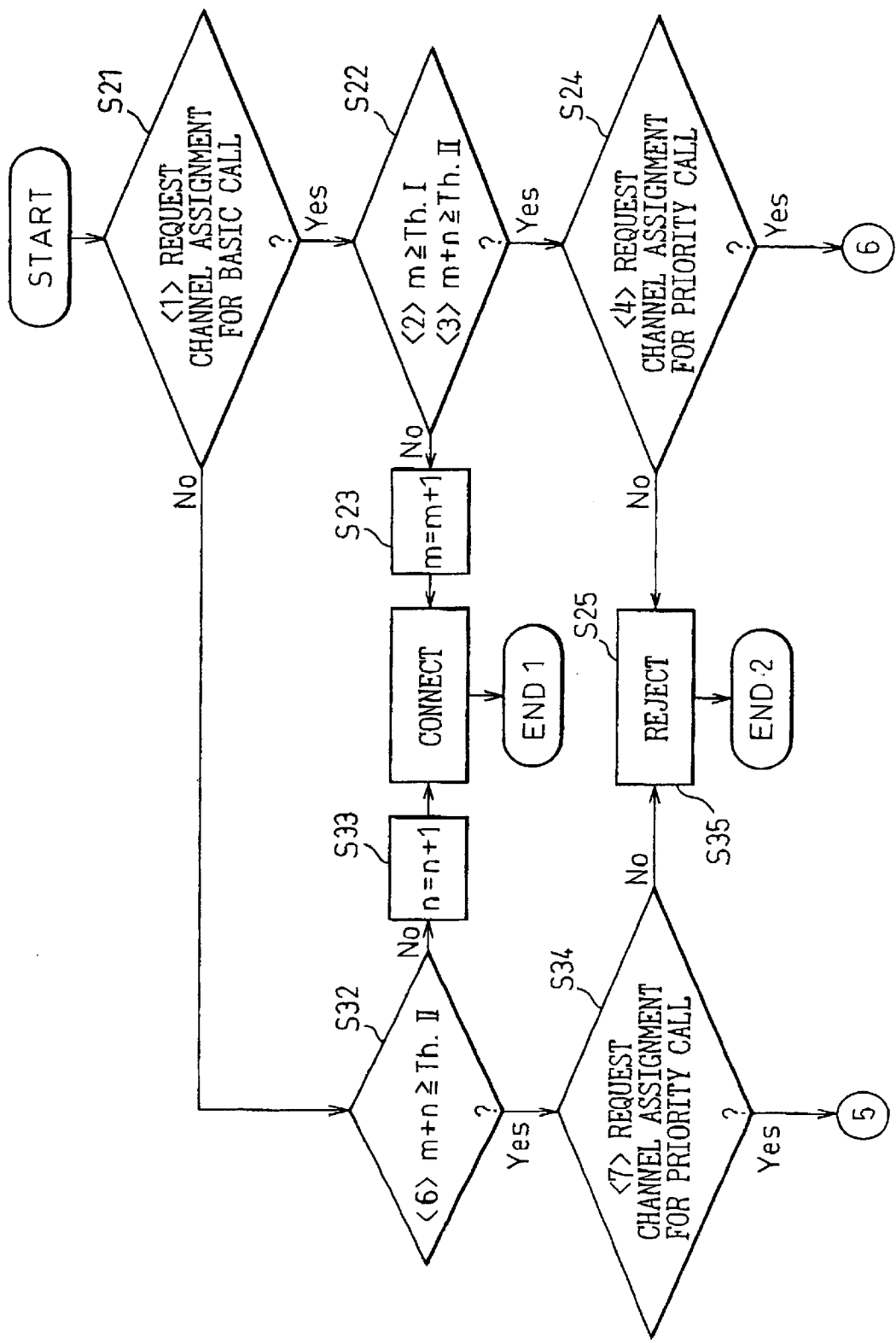
FIG. 4 is a first part of a flowchart showing steps of the method of connecting a priority call based on the present invention.
Figure 5:
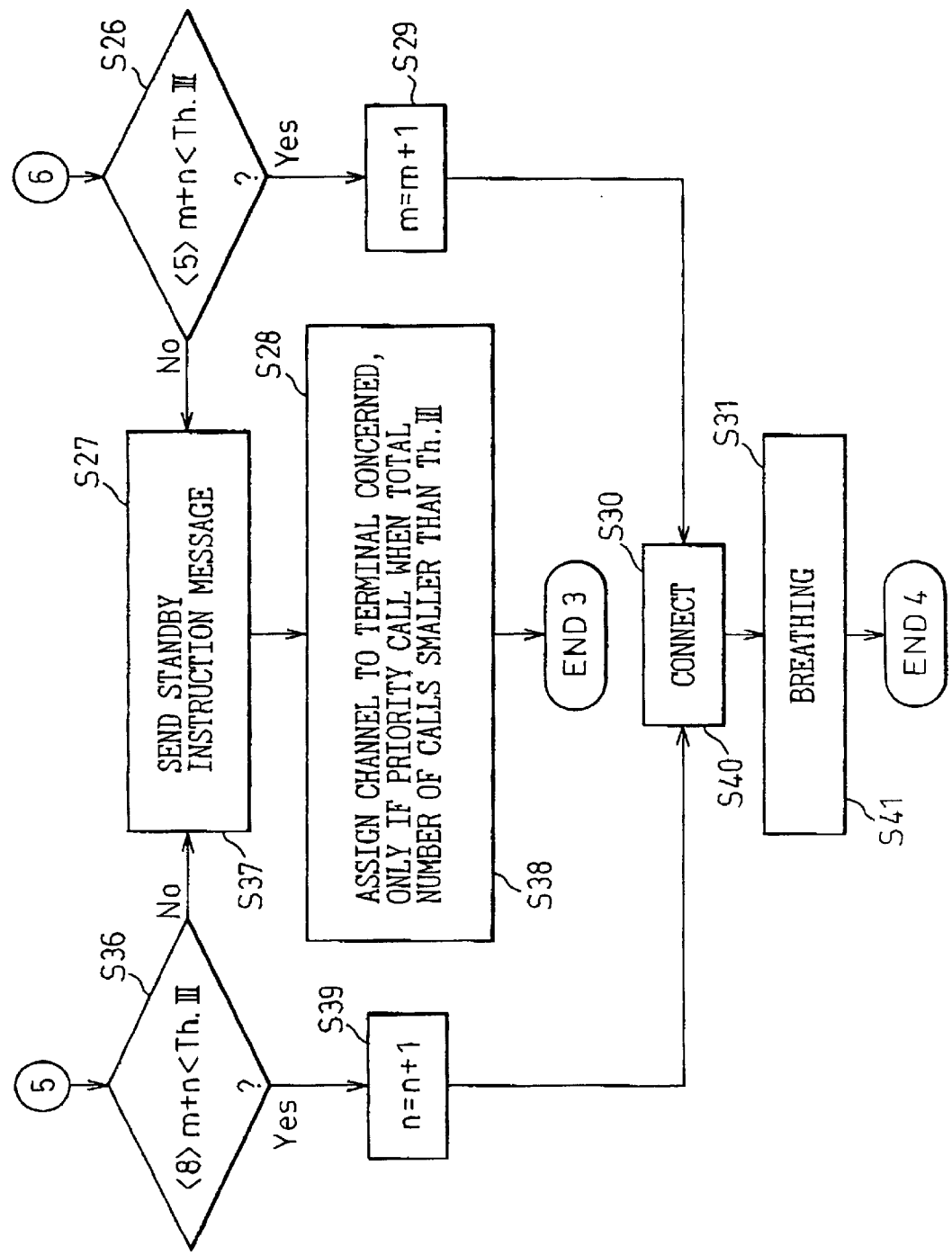
FIG. 5 is a second part of a flowchart showing steps of the method of connecting a priority call based on the present invention.
Figure 6:
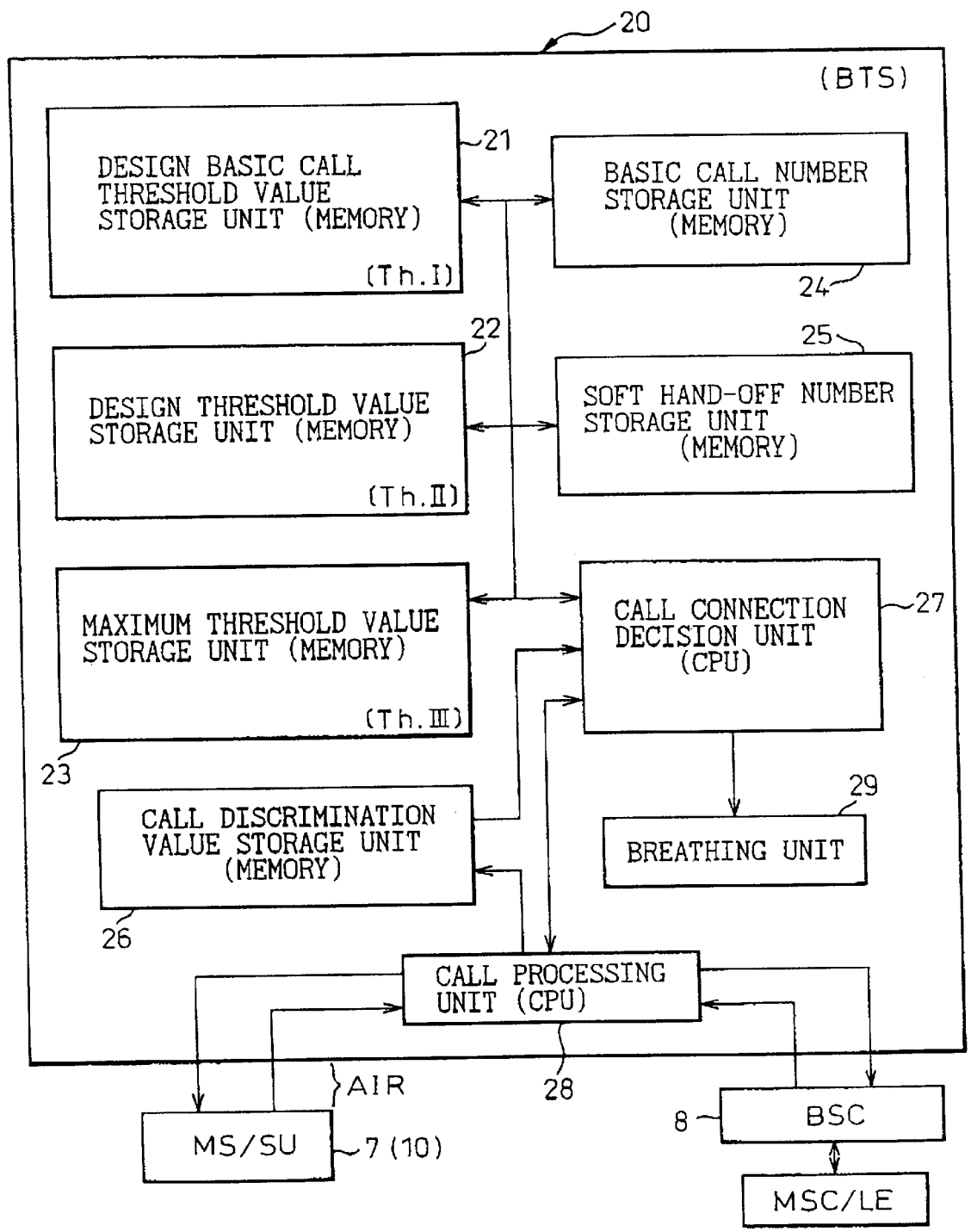
FIG. 6 is a view of an example of the configuration of an apparatus for connecting a priority call based on the present invention.

FIGS. 4 and 5 are parts of a flowchart of the steps of the method of connecting a priority call based on the present invention, while FIG. 6 is a view of an example of the configuration of an apparatus for connecting a priority call based on the present invention.

Before explaining the flowchart of FIG. 4 and FIG. 5, the configuration of the apparatus of FIG. 6 will be explained.

This priority call connection apparatus 20 is a priority call connection apparatus in a wireless communication system 1 which determines whether the total number of calls is smaller than a predetermined threshold whenever a call is originated from the terminal (mobile station, subscriber unit) side and assigns a channel in the wireless section AIR and connects the related call to the exchange (mobile switching center MSC/line exchanger LE) side when the total number is smaller than the threshold. The apparatus 20 can be provided alone independently anywhere in the wireless communication system 1, but preferably the priority call connection apparatus 20 is integrally formed with the base station transceiver subsystem 6. FIG. 6 shows an example of the latter.

In FIG. 6, a maximum threshold value storage unit 23 stores the preset maximum threshold Th.III placed between the critical threshold Th.IV constituting the upper limit, in terms of hardware, on the number of calls able to be assigned channels in the wireless section AIR and the design threshold Th.II constituting the upper limit, in terms of circuit design, on the number of calls able to be assigned channels in the wireless section AIR.

A call discrimination value storage unit 26 stores a call discrimination value for determining whether or not a generated call is a priority call.

A call connection decision unit 27 is provided with a function of determining whether the total number of calls is smaller than the maximum threshold Th.III even when the total number of calls (m+n of FIG. 3) reaches the design threshold Th.II or more when the generated call is a priority call.

A call processing unit 28 assigns a channel to the priority call based on the above function of determination and connects the priority call to the exchange (mobile switching center MSC/line exchanger LE) side.

Further, a design threshold value storage unit 22 stores the design threshold Th.II constituting the upper limit, in terms of circuit design, on the number of calls able to be assigned channels in the wireless section AIR mentioned above.

Further, a design basic call threshold value storage unit 21 stores the design basic call threshold Th.I constituting the upper limit, in terms of circuit design, on the total number of the basic calls able to be assigned channels in the wireless section.

A basic call number storage unit 24 stores the total number of the basic calls (m of FIG. 3) changing along with connection or disconnection of basic calls.

A soft hand-off number storage unit 25 stores the total number of soft hand-off calls (n of FIG. 3) changing along with the connection or disconnection of soft hand-off calls.

Furthermore, a breathing unit 29 controls a power to be sent to the terminal (mobile station MS, subscriber unit SU) side based on the decision by the call connection decision unit 27.

The call processing unit 28 further has the function of transmitting a standby message based on the decision by the call connection decision unit 27.

The method of connecting a priority call according to the present invention, executable by the priority call connection apparatus 20 mentioned above, will be explained below, while referring to FIG. 6, along with the flowchart shown in FIGS. 4 and 5.

START: The call processing unit 28 in the priority call connection apparatus 20 (for example, the base station transceiver subsystem (BTS) 6) receives a request for channel assignment from the base station controller 8. It then inputs a value according to the type of the call (for example, a value such as "00" if a basic call and ordinary call) to the call discrimination value storage unit 26 in the apparatus 20 and requests a decision on channel assignment in the wireless section AIR from the call connection decision unit 27.

Step S21: Receiving the request for a decision of assignment, the call connection decision unit 27 accesses the call discrimination value storage unit 26 and decides whether the related call is a basic call or soft hand-off call <1>.

Step S22: When the decision <1> is that the related call is a basic call (Yes), the call connection decision unit 27 determines the relative magnitude of the values (m, Th.I) in the basic call number storage unit 24 and the basic call threshold value storage unit 21 <2>.

Further, it determines the relative magnitude of the values (m+n, Th.II) between the basic call number storage unit 24 plus soft hand-off call number storage unit 25 and the design threshold value storage unit 22 <3>.

Step S23: When the results of the decisions <2> and <3> are "No", the call connection decision unit 27 instructs the call processing unit 28 to assign a channel and adds "1" to the value of the basic call number storage unit 24 (m=m+1).

The call processing unit 28 returns to the base station controller 8 a response that it is assigning a channel→END1.

Step S24: When the result of the decision <2> (or <3>) is "Yes", the call connection decision unit 27 determines whether the related call is a priority call or ordinary call <4>.

Step S25: When the result of the decision <4> is that the related call is an ordinary call (No), the call connection decision unit 27 instructs the call processing unit 28 that it cannot assign a channel.

The call processing unit 28 returns to the base station controller 8 a response that it is not assigning a channel→END2.

Step S26: When the result of the decision <4> is that the related call is a priority call (Yes), the call connection decision unit 27 determines the relative magnitude of the values (m+n, Th.III) between the basic call number storage unit 24 plus soft hand-off number storage unit 25 and the maximum threshold value storage unit 23 <5>.

Step S27: When the decision <5> is that m+n exceeds Th.III (No), the call connection decision unit 27 instructs the call processing unit 28 not to assign a channel.

In this case, the third embodiment of the present invention (standby instruction message) becomes effective. The call processing unit 28 sends the standby instruction message to the related terminal (mobile station MS, subscriber unit SU) and makes the related terminal enter the "standby state". Note that this requires a protocol enabling the wireless section to make a terminal stand by, which terminal is unable to be assigned a channel.

Step S28: When the call connection decision unit 27 determines that channel assignment is possible, that is, when it determines that the total number of calls (m+n) is smaller than the maximum threshold Th.III, it notifies this fact to the call processing unit 28.

The call processing unit 28 returns to the base station controller 8 a response that it is assigning a channel to the related terminal, that is, the terminal standing by the longest among the standing by terminals→END3.

Step S29: when the decision <5> is that m+n is smaller, the call connection decision unit 27 instructs the call processing unit 28 to assign a channel and adds "1" to m (m=m+1) in the basic call number storage unit 24. 24.

Step S30: The call processing unit 28 returns to the base station controller 8 a response that it is assigning a channel to the related terminal.

Step S31: The call connection decision unit 27 instructs the breathing unit 29 controlling the power transmitted to the terminal side to apply "breathing". Here, the second embodiment of the present invention (breathing) becomes effective→END4.

Step S21: Receiving the request for decision of assignment, the call connection decision unit 27 accesses the call discrimination value storage unit 26 and determines whether the related call is a basic call or a soft hand-off call <1>.

Step S32 (corresponding to step S22): When the decision <1> at step S21 is that the related call is a soft hand-off call (No), the unit determines the relative magnitude of the values (m+n, Th.II) between the basic call number storage unit 24 plus soft hand-off number storage unit 25 and the design threshold value storage unit 22 <6>.

Step 533 (corresponding to step S23): When the result of the decision <6> is No, the call connection decision unit 27 instructs the call processing unit 28 to assign a channel and adds "1" to the value (n=n+1) in the soft hand-off number storage unit 25.

The call processing unit 28 returns to the base station controller 8 a response that it is assigning a channel→END1.

Step S34 (corresponding to step S24): When the result of the decision <6> is Yes, the call connection decision unit 27 determines whether the related call is a priority call or ordinary call <7>.

Step.S35 (same as step S25): When the result of the decision <7> is that the related call is an ordinary call (No), the call connection decision unit 27 instructs the call processing unit 28 that it cannot assign a channel.

The call processing unit 28 returns to the base station controller 8 a response that it is not assigning a channel.

Step S36 (corresponding to step S26): When the result of the decision <7> is that the related call is a priority call (Yes), the call connection decision unit 27 determines the relative magnitude of the values (m+n, Th.III) between the basic call number storage unit 24 plus soft hand-off number storage unit 25 and the maximum threshold value storage unit 23 <8>.

Step S37 (same as step S27): When the decision <8> is that m+n exceeds Th.III (No), the call connection decision unit 27 instructs the call processing unit 28 not to assign a channel.

In this case, the third embodiment of the present invention (standby instruction) becomes effective. The call processing unit 28 sends the standby instruction message to the related terminal (mobile station MS, subscriber unit SU) and makes the related terminal enter the "standby state". Note that this requires a protocol enabling the wireless section to make a terminal stand by, which terminal is unable to be assigned a channel.

Step S38 (same as step S28): When the call connection decision unit 27 determines that channel assignment is possible, that is, when it determines that the total number of calls (m+n) is smaller than the maximum threshold Th.III, it notifies this fact to the call processing unit 28.

The call processing unit 28 returns to the base station controller 8 a response that it is assigning a channel to the related terminal, that is, the terminal standing by the longest among the standing by terminals→END3.

Step S39 (corresponding to step 529): When the decision <8> is that m+n is smaller, the call connection decision unit 27 instructs the call processing unit 28 to assign a channel and adds "1" to n (n=n+1) in the soft hand-off call number storage unit 25.

Step S40: The call processing unit 28 returns to the base station controller 8 a response that it is assigning a channel to the related terminal.

Step S41: The call connection decision unit 27 instructs the breathing unit 29 controlling the power transmitted to the terminal side to apply "breathing". Here, the second embodiment of the present invention (breathing) becomes effective→END4.

As already mentioned, the wireless communication system 1 includes at least one of the wireless local loop system 3 and the cellular system 2. When applying the present invention, however, basically the method of application of the present invention does not differ according to whether it is applied to the wireless local loop system 3 or the cellular system 2. Note however that there is a slight difference between the two systems in the detailed operation of step S24 (and step S34) in FIG. 4. Concretely, when the wireless communication system 1 is the cellular system 2, whether or not the generated call is a priority call is determined based on the discrimination information of the priority call or the ordinary call transferred from the exchange side. In the wireless local loop system 3, the terminal (subscriber unit SU) is fixed, so each subscriber information can be held in the corresponding base station controller 8. In the cellular system 2, however, since each terminal (mobile station MS) is mobile, each subscriber information cannot be held in the base station controller 8.

For this reason, the cellular system is designed to receive from the exchange side the discrimination information indicating whether the generated call is a "priority call or ordinary call" according to a predetermined protocol and perform the decision <4> or <7> (FIG. 4) based on the information.

Below, referring to FIG. 7 to FIG. 12, the resource management in each system will be clarified. In particular, the discrimination information indicating the "priority call or ordinary call" will be concretely shown.

Figure 7:
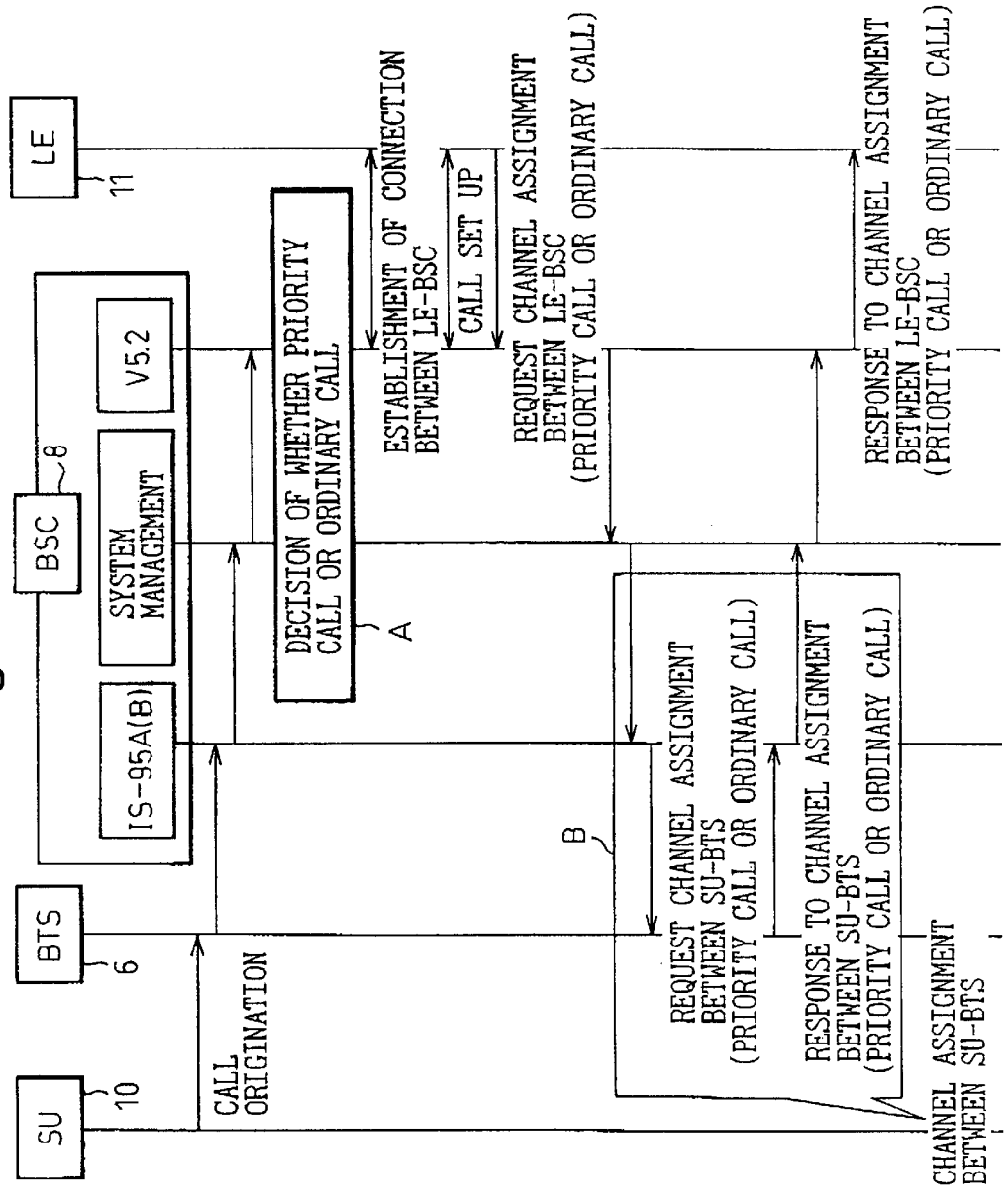
FIG. 7 is a view of the general sequence of channel assignment in a wireless local loop system.

FIG. 7 is a view of the general sequence of channel assignment in the wireless local loop system 3.

The parts to be particularly noted in the figure are the blocks A and B. The decision of whether a call is a priority call or ordinary call mentioned above is carried out in the block A. Further, the block B executes the operations shown in FIG. 4 and FIG. 5.

In FIG. 7, "IS-95A" or "IS-95B" is the name of the protocol between the base station transceiver subsystem and subscriber unit. The processing part thereof is shown in FIG. 7. Further, V5.2 is the name of the protocol between the line exchanger and the base station controller. The processing part thereof is shown in FIG. 7. Note that the protocol between the base station controller and base station transceiver subsystem depends upon the manufacturer.

For the "decision of priority call or ordinary call" in FIG. 7, in the wireless local loop system 3, since the terminals (subscriber units) are fixed, the terminal (subscriber) will belong to a specific base station controller 8 and the base station controller 8 will be able to hold the subscriber information in the form of a simple home location register (HLR).

FIG. 8 is a view of a display format of the general subscriber information. Using the table of FIG. 8, the base station controller 8 looks up the origination number and determines if the call is a priority call. For emergency calls among the priority calls, the base station controller 8 determines if the call is an emergency call from the destination number. Since emergency numbers are the same, it is possible to have all base station transceiver subsystems 6 hold that information.

In FIG. 8, "General" means an ordinary call, "Area No." is a number grouping a plurality of base station transceiver subsystems into a unit, a "Subscriber ID" is for deciding if the subscriber is formally registered, and the "L3 address" is an address used between line exchanger and base station controller. The value of the telephone no. is converted to the value of the L3 address between the line exchanger and base station controller.

In the present invention, general priority calls and emergency calls are referred to all together as priority calls without differentiating them, but here they are differentiated to clarify the flow of decision of the class of the call below.

Figure 9:
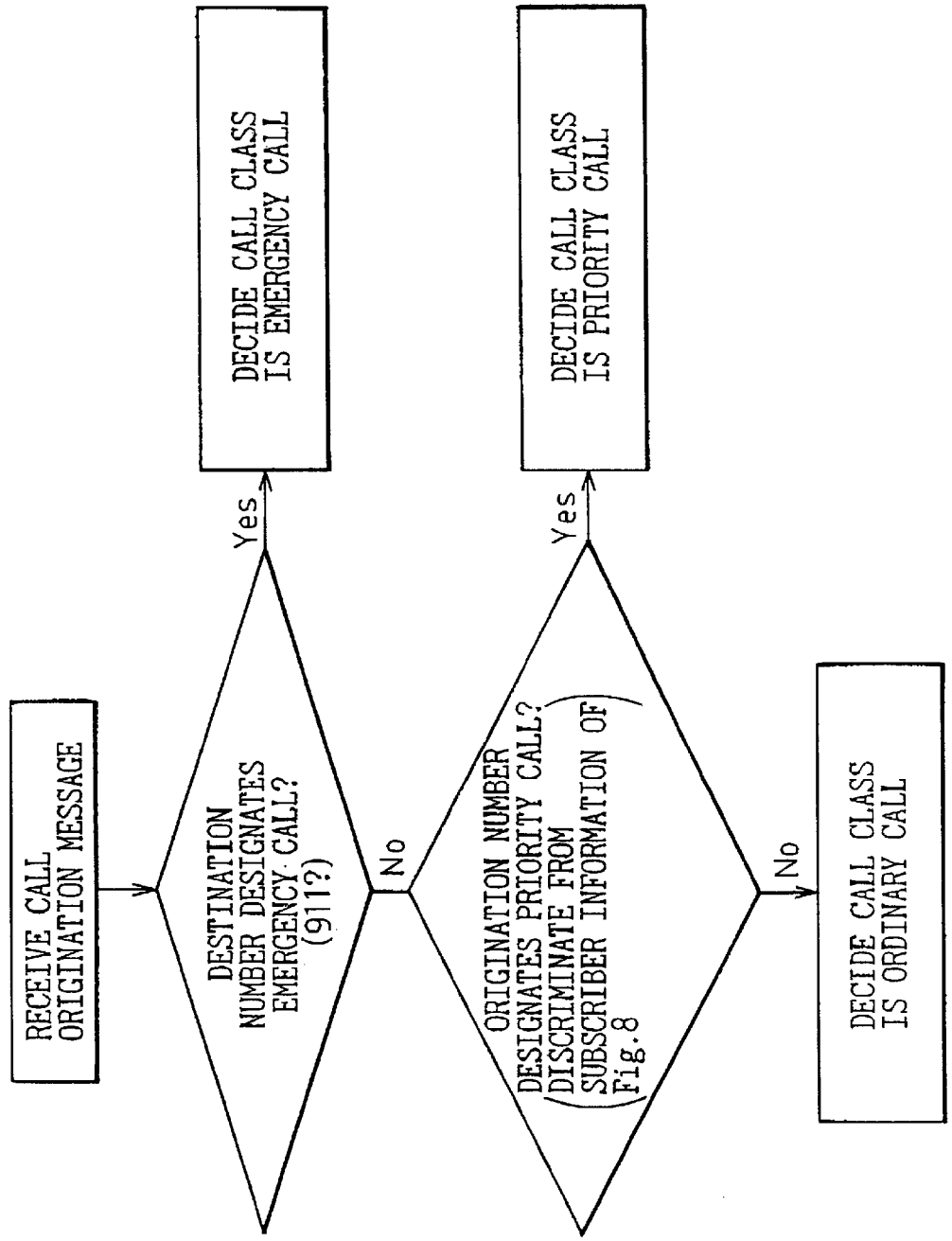
FIG. 9 is a view of the flow of determination of a class of a call.

FIG. 9 is a view of the flow of decision of the class of a call. Particularly, in the wireless local loop system 3, it is the flow of decision of the class of the call in the base station controller 8 when an emergency call or general priority call is generated. Note that since the system is a wireless local loop system, hand-off is not particularly considered.

Figure 10:
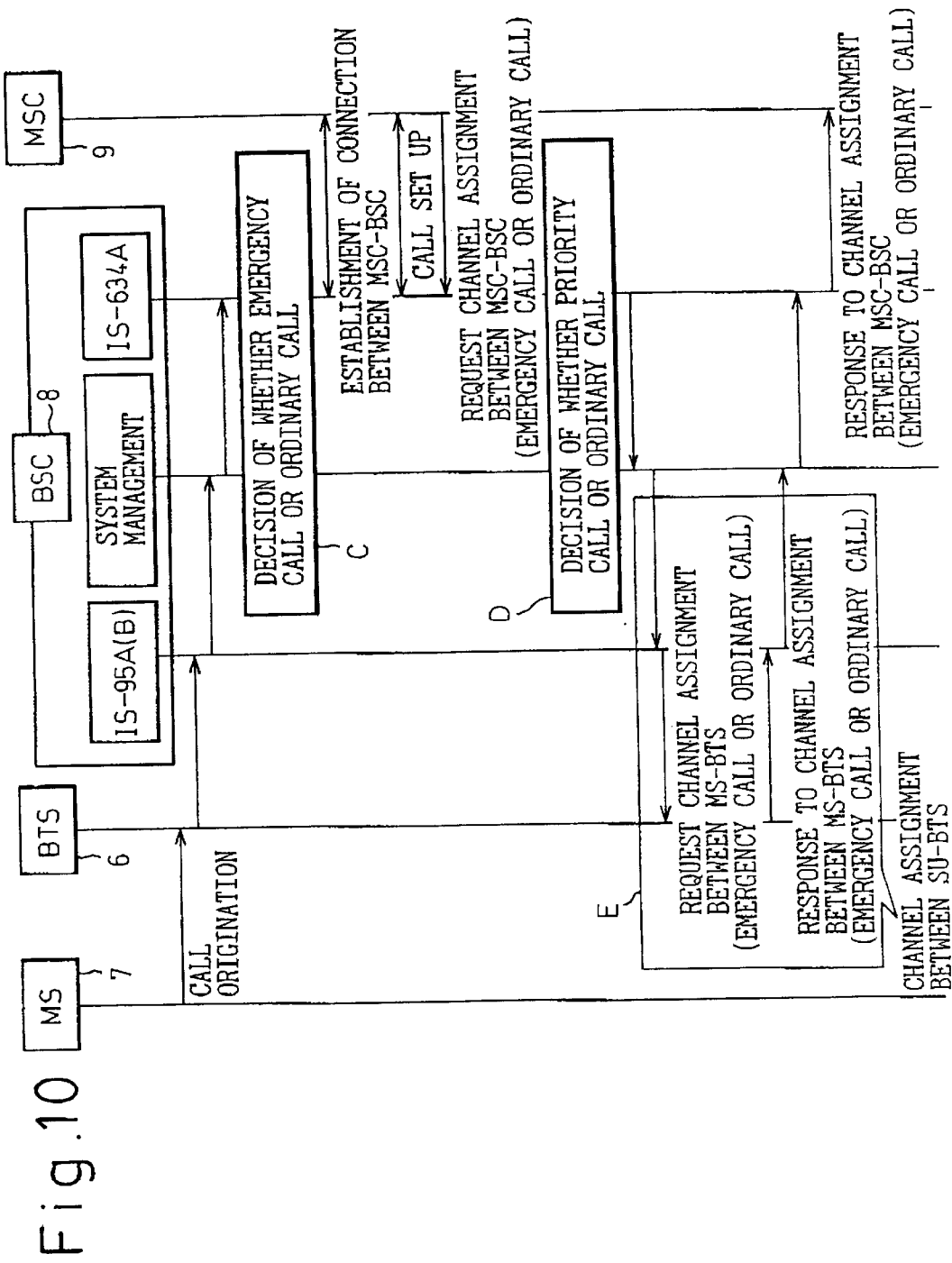
FIG. 10 is a view of the general sequence of channel assignment in a cellular system.

FIG. 10 is a view of the general sequence of the channel assignment in the cellular system 2, and FIG. 11 is a view of the general sequence of the channel assignment at the time of a soft hand-off in the cellular system 2.

In FIG. 10, blocks C and D are decision blocks of whether a call is "an emergency call or ordinary call" and "general priority call or ordinary call". Block E executes the operations shown in FIG. 4 and FIG. 5. Further, in FIG. 11, block F executes the operations shown in FIG. 4 and FIG. 5.

Particularly, FIG. 10 is a view of the general sequence of the channel assignment in the wireless section at the time of origination of a call in the cellular system 2, while FIG. 11 is a view of the general sequence view of the channel assignment in the wireless section at the time of a soft hand-off (the case where the terminal moves from base station transceiver subsystem #2 to base station transceiver subsystem #1) in the cellular system 2.

FIG. 10 and FIG. 11 show the general sequence for the channel assignment in the wireless section in the case where an emergency call or priority call is generated in the cellular system 2 and the case where the emergency call or the priority call is soft handed off.

"IS-95A" or "IS-95B" in FIG. 10 and FIG. 11 is the name of the protocol between the base station transceiver subsystem and mobile station. The processing part thereof is shown in FIG. 10 and FIG. 11. Further, "IS-634A" in FIG. 10 and FIG. 11 is the name of the protocol between the mobile switching center and base station controller. The processing part thereof is shown in FIG. 10 and FIG. 11. Note that the protocol between the base station controller and base station transceiver subsystem depends upon the manufacturer.

For the "decision of whether an emergency call or ordinary call" in FIG. 10, the base station controller 8 determines whether a generated call is an emergency call from the destination number. Since emergency numbers are the same, it is possible to make all base station transceiver subsystems 6 hold that information.

For the "decision of whether priority call or ordinary call" in FIG. 10, since the terminals (mobile stations) move in a cellular system 2, the terminals (subscribers) do not belong to any specific base station controller 8, so unlike the wireless local loop system 3, the base station controller 8 cannot hold subscriber information. Accordingly, in the cellular system 2, it is necessary for the mobile switching center 9 to determine a priority call. In the IS-634A, the current protocol between a mobile switching center and base station controller, a message such as an "assignment request" is used for mobile switching center 9 to request from the base station controller 8 a channel assignment between the mobile switching center and base station controller, but this message only enables determination of whether a call is an emergency call or ordinary call. Therefore, in order to realize the present invention, it is necessary to include priority call information in the discrimination information. Here, it is assumed that call class information (decision of whether priority call or emergency call or ordinary call is possible) is contained in the request of channel assignment between the mobile switching center and base station controller.

FIG. 12 is a view of the flow of decision of the class of a call in a cellular system. This corresponds to FIG. 9 mentioned above. FIG. 12 shows the operation of the determination of the call class at the base station controller 8 when an emergency call or priority call is generated.

Finally, for a further understanding of the present invention, a supplementary explanation will be made of the standby instruction message and "breathing" (constituting the principal parts of the third and second embodiments of the present invention) and further the soft hand-off etc.

As mentioned above, at step S26 or S36 of FIG. 5, when it is determined that the total number of calls (m+n) exceeds the maximum threshold Th.III, at step S27 (S37), a standby instruction message is sent to the related terminal. As an example of this standby instruction message, the priority access and channel assignment (PACA) sequence in the IS-95B protocol can be mentioned. Other than this, there is also a similar sequence determined by Association of Wireless Industry and Business (ARIB).

Figure 13A:
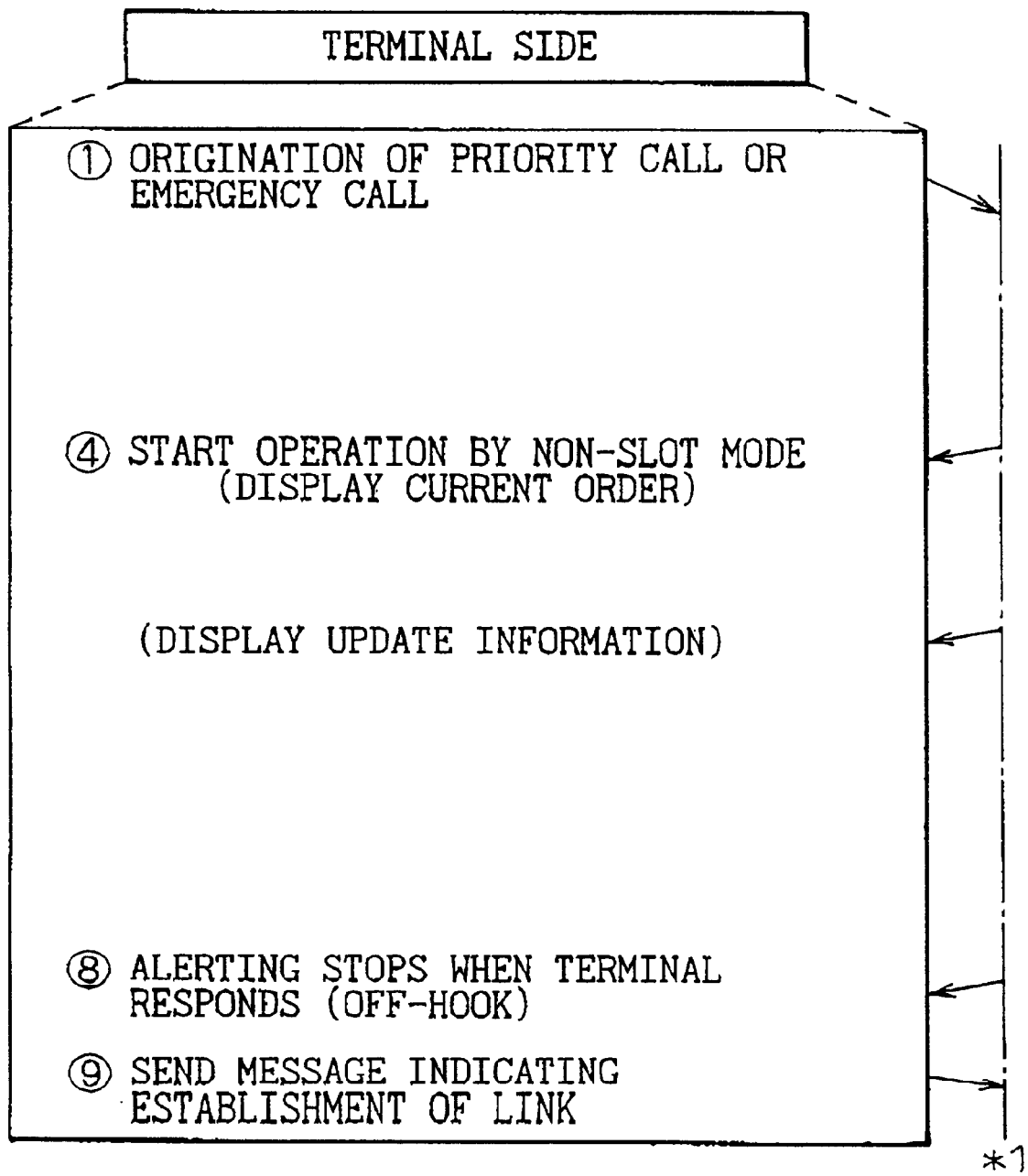
FIGS. 13A and 13B are views of a priority access and channel assignment sequence.
Figure 13B:
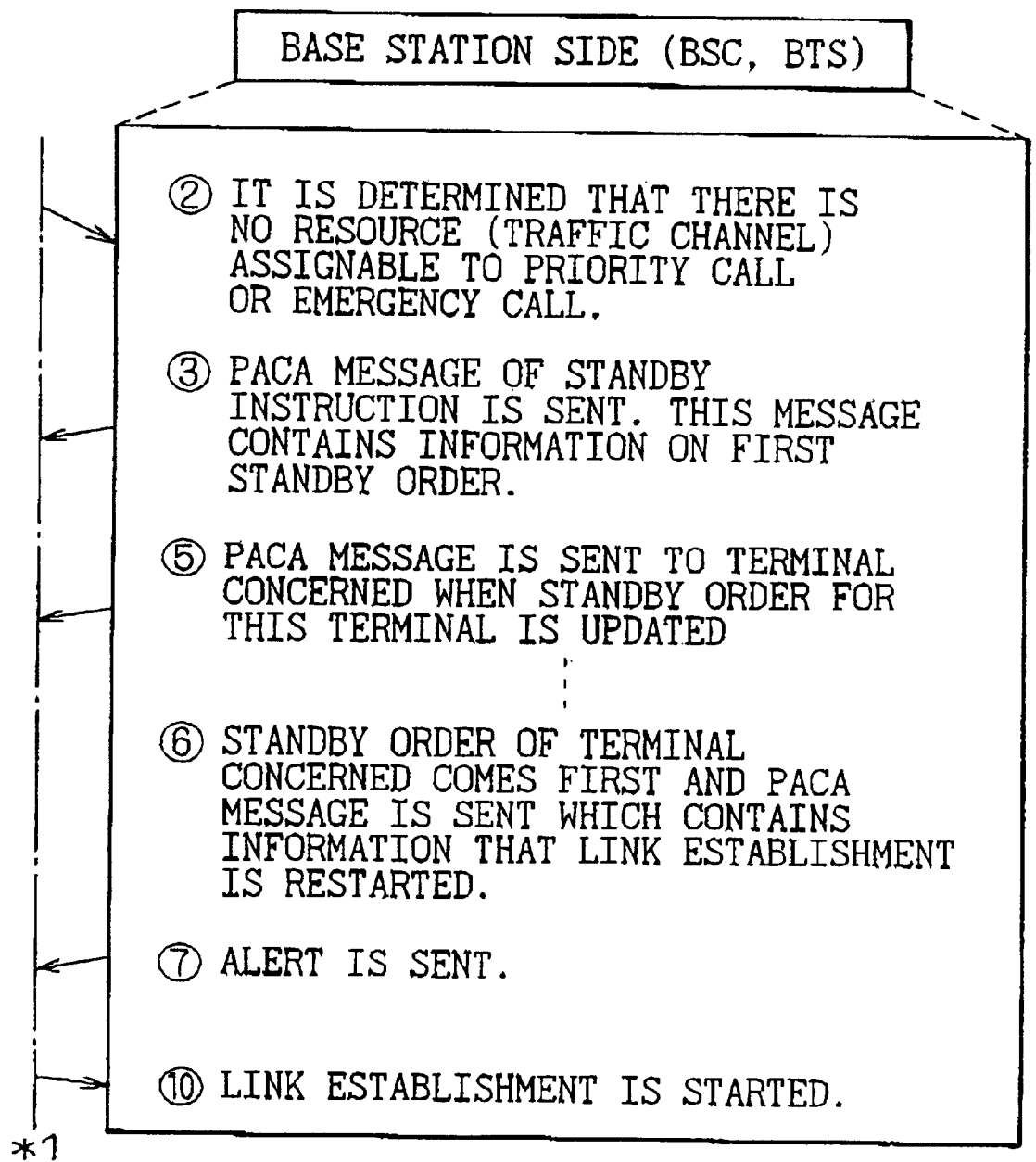

FIGS. 13A and 13B are views of the PACA sequence. Note that the priority call shown here is a general priority call.

Next, an explanation will be made of the soft hand-off breathing, etc. In general, in a wireless communication system using CDMA, it is well known that the techniques of power control and soft hand-off are important. These techniques will be explained in further detail.

(i) For power control

In the CDMA system, the power is just one resource. When the "lowest required amount" is "equally shared", a high cell capacity is realized. As the "lowest required amount", the power required for maintaining 1% of the frame error rate (FER) is regarded as one index. When the frame error rate of a reverse link at a certain base station transceiver subsystem is large, the quality of the coverage area thereof deteriorates. Therefore, when the frame error rate is small, an interference wave to the interior of the coverage area of the other base station transceiver subsystems is increased. For this reason, as an optimum value thereof, 1% of the frame error rate has been considered. Power control is an indispensable technique for commonly using power while the overall system satisfies the condition of a 1% frame error rate.

Transmission power control is roughly classified into reverse link power control performed by the mobile station and forward link power control performed by the base station transceiver subsystem. The reverse link transmission power control includes three types: open loop estimate control calculating the reverse transmission power from the received power, closed loop correction control for control while monitoring the reverse link side Eb/No on the base station transceiver subsystem side, and outer loop control for control while monitoring the frame error rate of the reverse link on the base station transceiver subsystem side. By the interaction of these controls, it becomes possible for all frame error rates of the reverse links from the terminals to approach 1% (equally share the limited power). The forward link transmission power control includes two types: traffic channel transmission power control for control so that the frame error rate of the traffic channel (forward link) of the mobile station side becomes 1% and pilot channel transmission power control for controlling the transmission power of the pilot channel by monitoring the load of the cell on the base station transceiver subsystem side. By these two controls, the maintenance of the quality of the forward link and change of the size of the coverage area of a base station transceiver subsystem adaptively according to the degree of the load of the base station transceiver subsystem become possible.

(ii) Breathing

The term "breathing" is derived from the fact that the state of the coverage area becoming larger or smaller along with control of the pilot channel transmission power from the base station transceiver subsystem looks someone inhaling and exhaling air.

When lowering the power of the pilot channel from the base station transceiver subsystem, a terminal (mobile station) located at the periphery of the coverage area will be softly handed off to the base station transceiver subsystem of the adjoining cell (or sector) since the power of the pilot channel from the base station transceiver subsystem becomes lower than the communicable range. Further, when the load of the base station transceiver subsystem of the adjoining cell is light, it is possible to raise the transmission power of the pilot channel to increase the coverage area thereof and reduce the load of the adjoining cell (or sector). In this way, "breathing" means the change of the size of the coverage area by controlling the transmission power of the pilot channel according to the load of the base station transceiver subsystem (FIG. 14).

Figure 14:
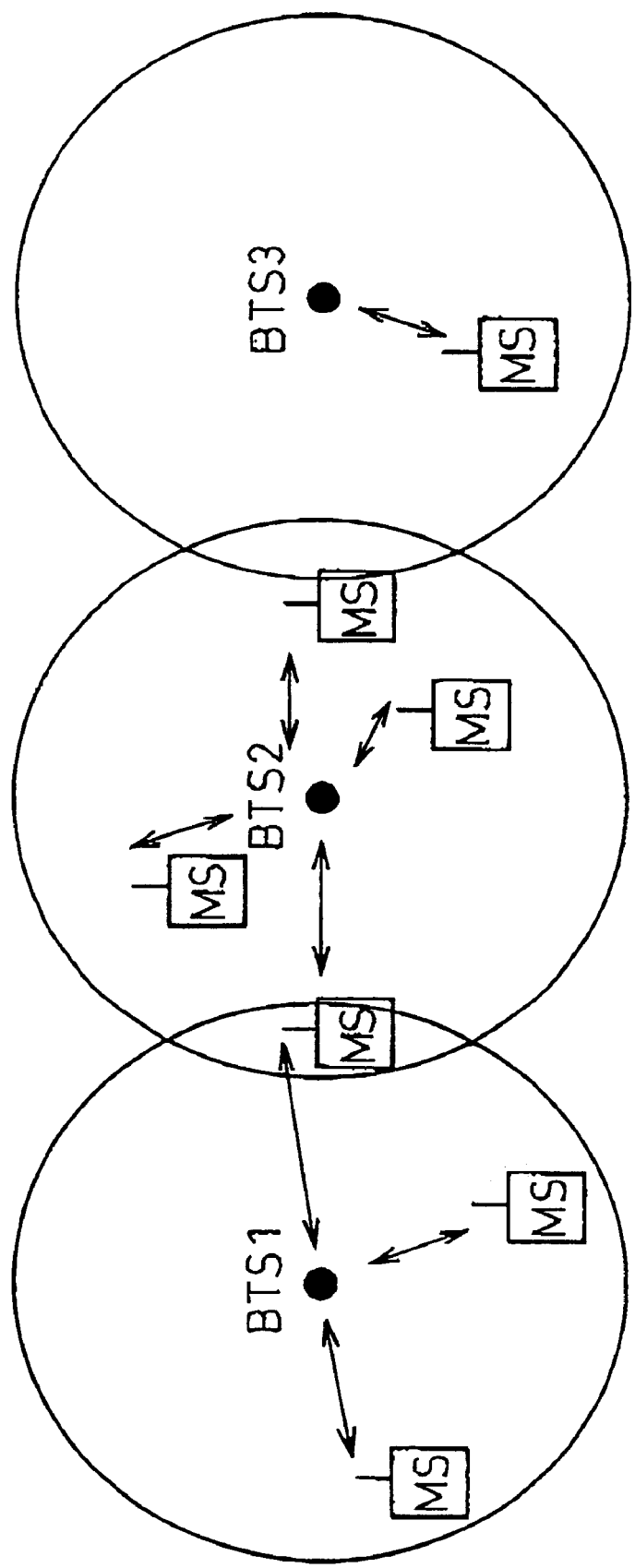
FIG. 14 is a first part of a view of the image of the state of the contraction/expansion of a coverage area due to breathing.
Figure 15:
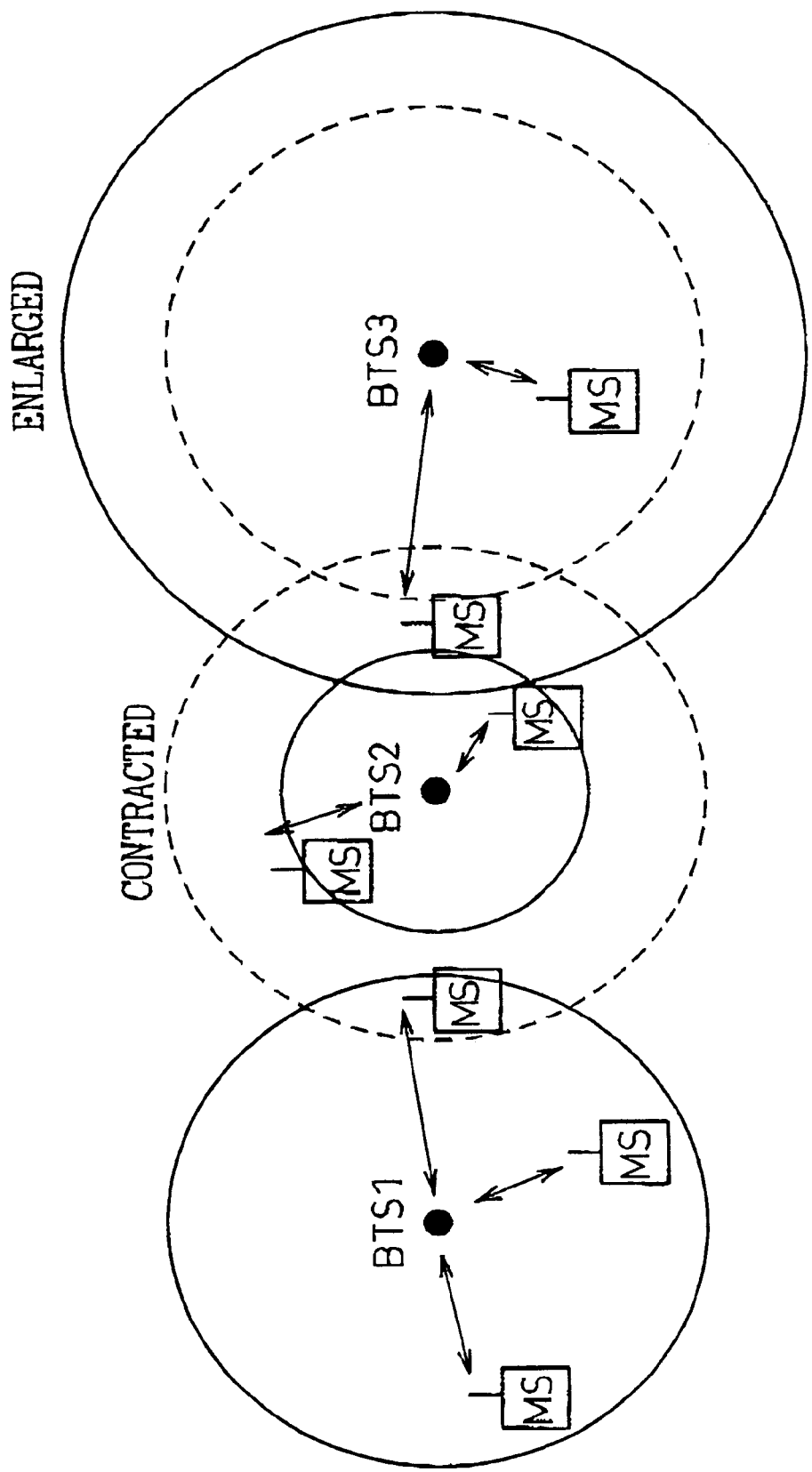
FIG. 15 is a second part of a view of the image of the state of the contraction/expansion of a coverage area due to breathing.

FIGS. 14 and 15 are parts of a view of the situation of the coverage area contracting and expanding along with breathing.

(iii) Hand-off

In hand-off during the progress of a call, a soft hand-off without any momentary disconnection is made possible by setting up a plurality of paths having the same frequency with a plurality of base station transceiver subsystems. However, there are also cases where a call must be handed off to a different frequency when a terminal moves to a wireless area of another base station transceiver subsystem due to various factors. At that time, there is a hard hand-off accompanied by momentary disconnection.

In the case of this hard hand-off as well, the base station transceiver subsystem to which the call is to be handed off assigns a channel by treating the call as a soft hand-off as in the present invention and by discriminating an ordinary call and a priority call and performing similar processing.

(iv) Securing channel capacity by soft hand-off

Soft hand-off occurs along with movement of a terminal under the same exchange and assignment of a channel of the same frequency, which is an indispensable technique for avoiding deterioration of the channel capacity.

Figure 16:
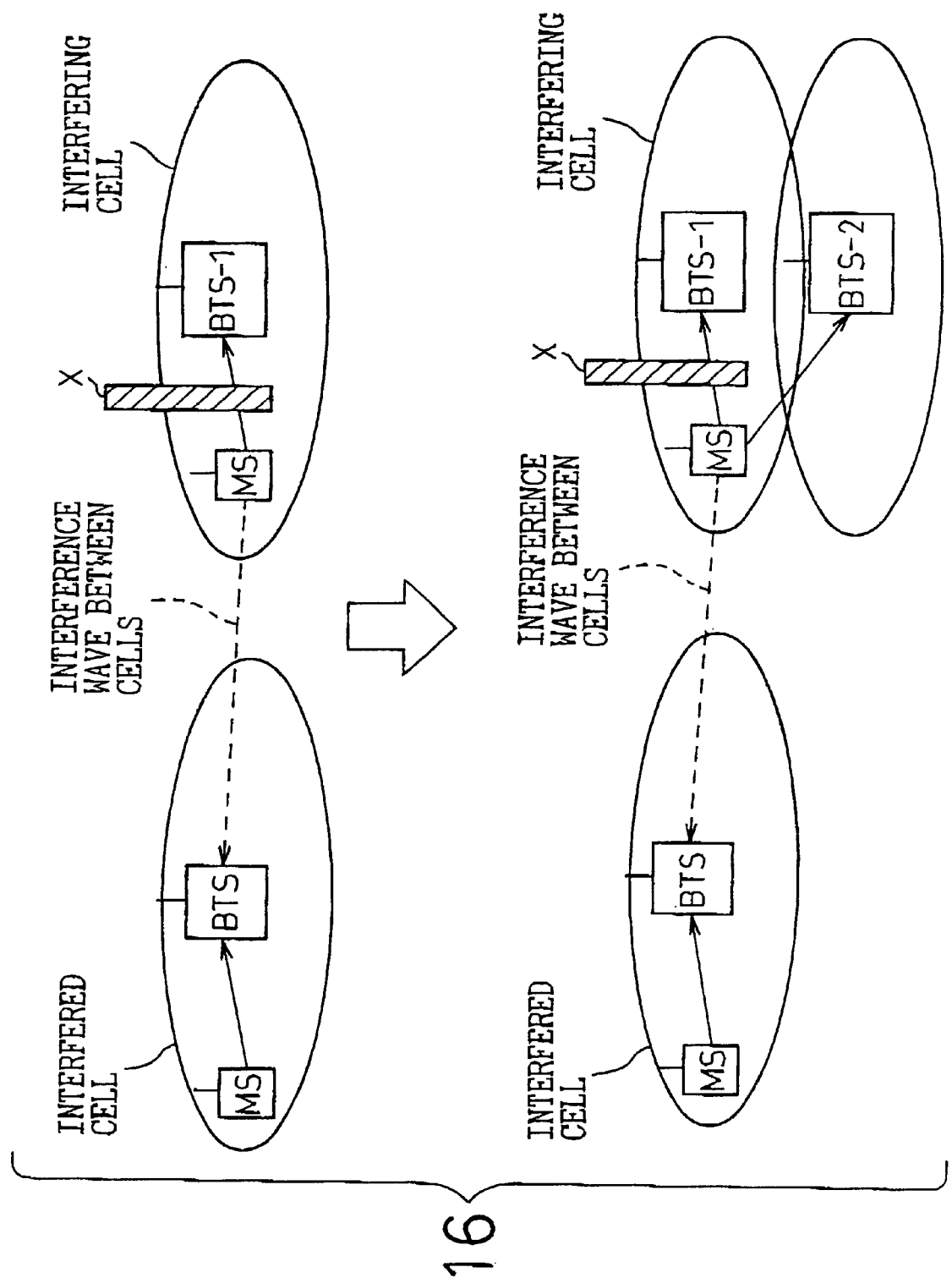
FIG. 16 is a view for explaining a soft hand-off.

FIG. 16 is a view for explaining the soft hand-off. The upper part of the figure shows a cell interference without soft hand-off, while the lower part shows a cell interference with soft hand-off (example of two base station transceiver subsystems being connected).

As shown in FIG. 16, when there is an obstacle in an interfering cell, the terminal increases the transmission power to give a certain value of received power at the base station transceiver subsystem BTS-1, so the power of the inter-cell interference wave increases and the channel capacity in the interfered cell decreases.

In order to prevent this, the side diversity effect by the soft hand-off is utilized. A terminal is simultaneously connected to a plurality of base station transceiver subsystems. If there is an obstacle X between the terminal and the base station transceiver subsystem BTS-1, communication with the base station transceiver subsystem BTS-2 is enabled. If there is no obstacle between the terminal and the base station transceiver subsystem BTS-2, the terminal does not have to raise the transmission power more than necessary, so the interference power with respect to the interfered cell decreases, and the reduction of the channel capacity in the interfered cell can be prevented. A terminal located at a periphery of a cell is simultaneously connected with a plurality of base station transceiver subsystems in this way usually, it can connect to up to three base station transceiver subsystems.

The larger the number of base station transceiver subsystems which a mobile station simultaneously connects to, the more reliably the interference power to the interfered cell decreases, but the number of channels in the coverage areas of the connected base station transceiver subsystems decrease by that amount, so it is necessary to determine a suitable number of base station transceiver subsystems to be connected with. Further, the larger the channels for soft hand-off calls, the less the disconnection of hand-off terminals, but the smaller the channel capacity for basic calls, so it is also important to find an adequate soft hand-off ratio.

(v) For hand-off accompanied with breathing

The hand-off of a terminal located at the periphery of an area under breathing will be explained next.

Figure 17A:
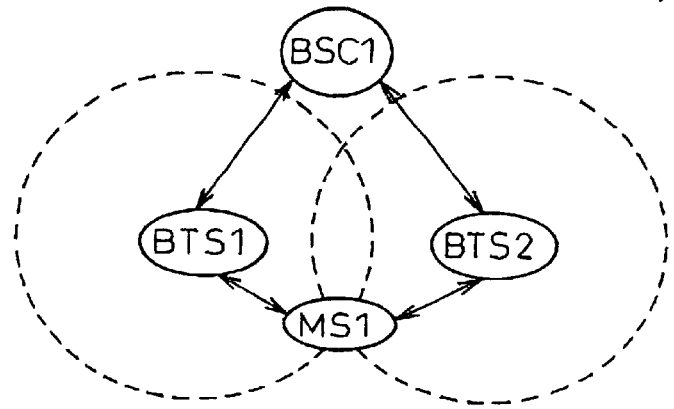
FIGS. 17A, 17B, and 17C are views for explaining a soft hand-off at a periphery of an area under breathing.
Figure 17B:
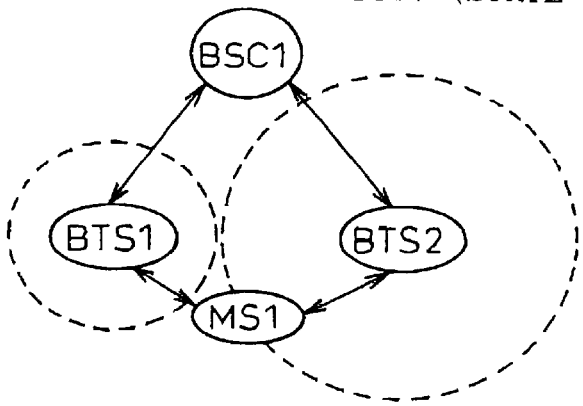
Figure 17C:
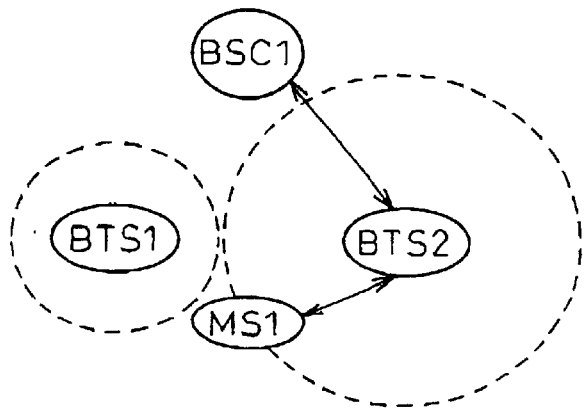
Figure 18:
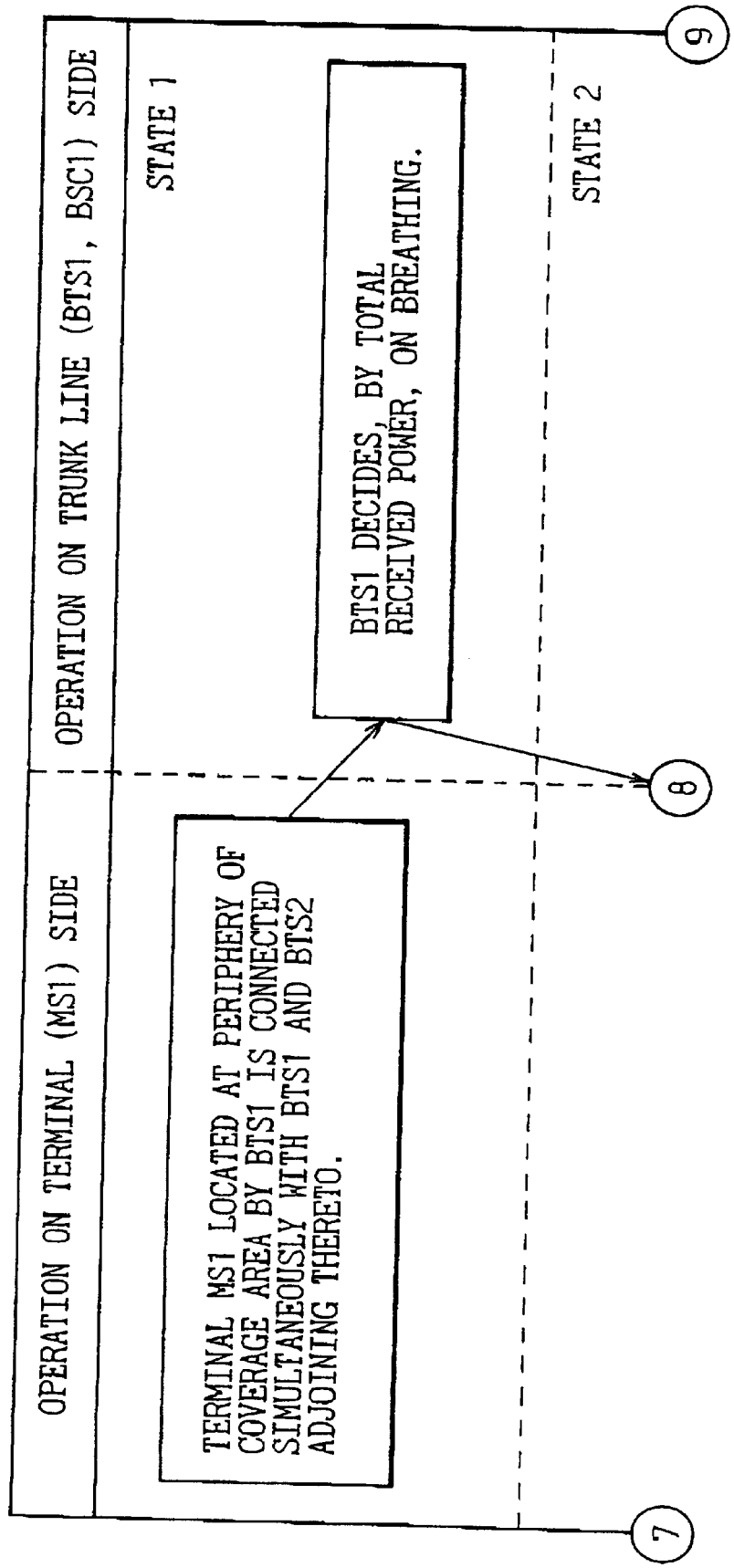
FIG. 18 is a first part of a view of the sequence of soft hand-off performed in FIGS. 17A to 17C.
Figure 19:
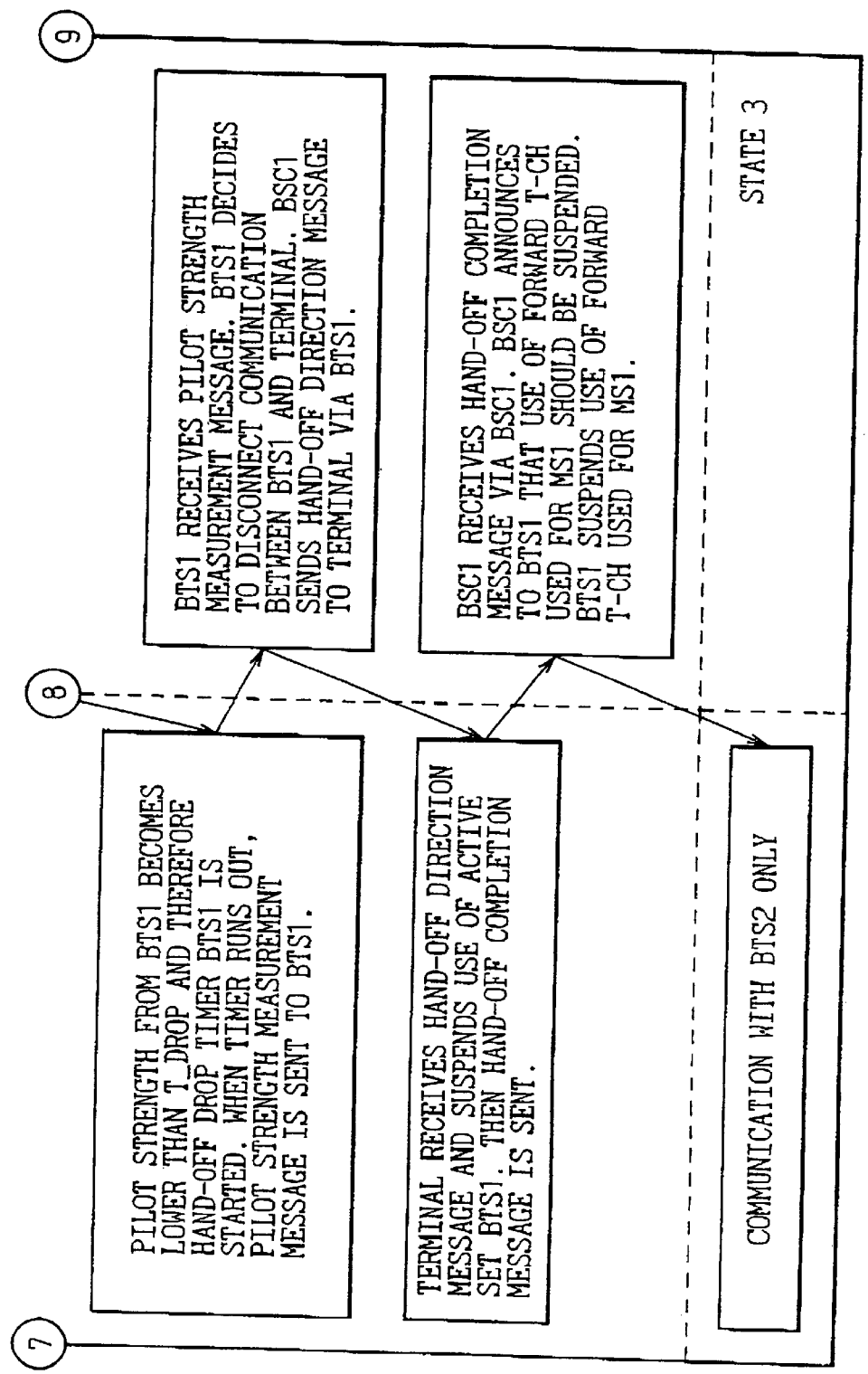
FIG. 19 is a second part of a view of the sequence of soft hand-off performed in FIGS. 17A to 17C.

FIGS. 17A to 17C are views for explaining soft hand-off at the periphery of an area under breathing, FIGS. 18 and 19 are parts of a view of sequence of soft hand-off carried out in FIGS. 17A to 17C.

A terminal located at the periphery of an area is simultaneously connected to a plurality of base station transceiver subsystems in order to prevent deterioration of the channel capacity as mentioned in the above (iv). At this time, when it is determined that one of the simultaneously connected base station transceiver subsystems is overloaded in view of the received total power, the transmission power of the pilot channel is reduced to make the coverage area of the same base station transceiver subsystem smaller. By this, the terminal at the periphery of the cell finishes the communication with that base station transceiver subsystem and completes the hand-off.

(vi) Finally, an explanation will be given of the background behind the present invention based on the above (i) to (v).

The channel capacity is usually set so that a predetermined speech quality can be maintained in the system as a whole. The assignable channel capacity in terms of hardware and the channel capacity determined by the circuit design so as to enable a predetermined speech quality to be maintained do not coincide. Further, the number of calls in terms of the circuit design is determined according to the soft hand-off ratio. For example, when the soft hand-off ratio is 100%, the base station transceiver subsystem assigns for the basic calls only a half of the channels assignable within a range enabling a predetermined speech quality to be maintained and uses the remaining half as channels for only soft hand-off call.

For example, when a base station controller requests channel assignment for a basic call to the base station transceiver subsystem in a state where the channel capacity for the basic calls determined in the circuit design of certain base station transceiver subsystem is all used up (reaches the design basic call threshold Th.I), connection is refused. In the case of a priority call, the priority call is connected preferentially by compulsorily disconnecting another terminal.

As explained above, according to the present invention, (i) channel assignment making full utilization of the resources of the systems is realized and thereby (ii) failure of connection (call loss) of an emergency call or general priority call can be prevented without sacrificing other ordinary calls in progress when an emergency call or general priority call is generated.

While the invention has been described by reference to specific embodiments chosen for purposes of illustration, it should be apparent that numerous modifications could be made thereto by those skilled in the art without departing from the basic concept and scope of the invention.

What is claimed is:

1. A method of connecting a priority call in a wireless communication system using code division multiple access (CDMA) by determining whether a total number of calls is smaller than a predetermined threshold each time a call is generated from a terminal side, assigning one of a plurality of channels in a wireless section when it is smaller than the threshold, and then connecting the related call to an exchange side, comprising:

presenting a maximum threshold placed between a critical threshold constituting an upper limit of the number of calls, in terms of hardware, to which calls the channels can be assigned in said wireless section and a design threshold constituting an upper limit of the number of calls, in terms of circuit design, to which calls the channels can be assigned in said wireless section, wherein said design threshold is determined as a function of a number of channels which are required to maintain a wireless communication at a predetermined quality of service; and even if said total number of calls reaches said design threshold or more, assigning a channel to a priority call and connecting it to the exchange side when determining that the generated call is a priority call and determining that the total number of calls is smaller than said maximum threshold.

2. A method of connecting a priority call as set forth in claim 1, further comprising adding 1 to said total number of calls when assigning a channel to said priority call and connecting the priority call to the exchange side and executing breathing when determining that the total number of calls has reached said design threshold or more.

3. A method of connecting a priority call as set forth in claim 1, further comprising:

sending a standby instruction message to said terminal generating the related priority call when determining that the total number of calls has reached the maximum threshold or more and then, when determining that said total number of calls has become smaller than said maximum threshold, preferentially assigning a channel to the related priority call and connecting it to the exchange side.

4. A method of connecting a priority call as set forth in claim 1, further comprising determining said total number of calls by a sum of basic calls constituting calls set at the start of communication and soft hand-off calls constituting calls newly entered by soft hand-off.

5. A method of connecting a priority call as set forth in claim 4, further comprising, when a priority call is generated as said basic call, assigning a channel to the related priority call and connecting it to the exchange side even if it determines that the total number of said basic calls able to be assigned channels in said wireless section has reached a design basic call threshold constituting the upper limit, in terms of circuit design, or more, when it determines that said total number of calls is smaller than said design threshold.

6. A method of connecting a priority call as set forth in claim 4, further comprising, when a priority call is generated as said basic call, determining whether said total number of calls is smaller than said maximum threshold when it is determined that the total number of said basic calls able to be assigned channels in said wireless section is smaller than the design basic call threshold constituting the upper limit, in terms of circuit design, and said total number of calls has reached said design threshold or more.

7. A method of connecting a priority call as set forth in claim 4, further comprising, when a priority call is generated as said basic call, determining whether said total number of calls is smaller than said maximum threshold when it determines that the total number of said basic calls able to be assigned channels in said wireless section has reached the design basic call threshold constituting the upper limit, in terms of circuit design, or more and said total number of calls has reached said design threshold or more.

8. A method of connecting a priority call as set forth in claim 4, further comprising, when a priority call is generated as said soft hand-off call, determining whether said total number of calls is smaller than said maximum threshold when determining that said total number of calls has reached said design threshold or more.

9. A method of connecting a priority call as set forth in claim 1, wherein said wireless communication system includes at least one of a wireless local loop system and a cellular system.

10. A method of connecting a priority call as set forth in claim 9, further comprising, when said wireless communication system is a cellular system, determining whether said generated call is a priority call based on discrimination information, transferred from said exchange side, of a priority call or ordinary call.

11. An apparatus for connecting a priority call in a wireless communication system using code division multiple access (CDMA) by determining whether a total number of calls is smaller than a predetermined threshold each time a call is generated from a terminal side, assigning one of a plurality of channels in a wireless section when it is smaller than the threshold, and then connecting the related call to an exchange side, comprising:

a maximum threshold value storage unit for storing a preset maximum threshold placed between a critical threshold constituting an upper limit of the number of calls, in terms of hardware to which calls the channels can be assigned in said wireless section and a design threshold constituting an upper limit of the number of calls, in terms of circuit design, to which calls the channels can be assigned in said wireless section, wherein said design threshold is determined as a function of a number of channels which are required to maintain a wireless communication at a predetermined quality of service;

a call discrimination value storage unit for storing a call discrimination value for determining whether a generated call is a priority call, a call connection decision unit provided with a decision function of determining whether said total number of calls is smaller than said maximum threshold even if said total number of calls reaches said design threshold or more when said generated call is a priority call, and a call processing unit for assigning a channel to said priority call under said decision function and connecting the priority call to an exchange side.

12. An apparatus for connecting a priority call as set forth in claim 11, further comprising a design threshold value storage unit for storing the design threshold constituting an upper limit, in terms of circuit design, on the number of calls able to be assigned channels in said wireless section.

13. An apparatus of connecting priority call as set forth in claim 12 further comprising:

a design basic call threshold value storage unit for storing the design basic call threshold constituting the upper limit, in terms of circuit design, on the total number of said basic calls able to be assigned channels in said wireless section, a basic call number storage unit for storing the total number of said basic calls changed according to connection or disconnection of a basic call, and a soft hand-off number storage unit for storing the total number of soft hand-off calls changed according to the connection or disconnection of a soft hand-off call.

14. An apparatus for connecting a priority call as set forth in claim 11 further comprising a breathing unit for control of transmission power to said terminal side based on the decision by said call connection decision unit.

15. An apparatus of connecting priority call as set forth in claim 11 wherein said call processing unit further has a function of transmitting a standby message based on the decision by said call connection decision unit.

16. An apparatus of connecting priority call as set forth in claim 11 wherein said priority call connection apparatus is integrally formed with a base station transceiver subsystem.

* * * * *